US012683277B2

(12) United States Patent
Kitagawa et al.

(10) Patent No.: US 12,683,277 B2
(45) Date of Patent: Jul. 14, 2026

(54) PHASED ARRAY ANTENNA

(71) Applicant: Sharp Display Technology Corporation, Kameyama City (JP)

(72) Inventors: Hideki Kitagawa, Kameyama City (JP); Yoshimasa Chikama, Kameyama City (JP); Masamitsu Yamanaka, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 202 days.

(21) Appl. No.: 18/811,970

(22) Filed: Aug. 22, 2024

(65) Prior Publication Data

US 2025/0105504 A1 Mar. 27, 2025

(30) Foreign Application Priority Data

Sep. 26, 2023 (JP) ................................ 2023-163150

(51) Int. Cl.
*H01Q 3/36* (2006.01)

(52) U.S. Cl.
CPC .................................... *H01Q 3/36* (2013.01)

(58) Field of Classification Search
CPC .......... H01Q 3/36; H01Q 1/2283; H01Q 1/38; H01Q 3/34
See application file for complete search history.

(56) References Cited

U.S. PATENT DOCUMENTS

| | | | |
|---|---|---|---|
| 2017/0065178 A1 | 3/2017 | Suzuki et al. | |
| 2019/0008432 A1 | 1/2019 | Bashan et al. | |
| 2019/0252925 A1* | 8/2019 | Zeine | H10D 86/40 |
| 2020/0099124 A1* | 3/2020 | Matsubara | H01Q 1/2283 |
| 2022/0037785 A1 | 2/2022 | Okita | |

(Continued)

FOREIGN PATENT DOCUMENTS

| | | |
|---|---|---|
| JP | 2000138512 A | 5/2000 |
| JP | 2019506205 A | 3/2019 |
| JP | 6642421 B2 | 2/2020 |

(Continued)

*Primary Examiner* — William Kelleher
*Assistant Examiner* — Kenneth W Good
(74) *Attorney, Agent, or Firm* — Keating & Bennett, LLP

(57) ABSTRACT

A phased array antenna with excellent reliability is provided. The phased array antenna includes a printed circuit board 10 including a plurality of first terminals, a TFT substrate 50 including a plurality of second terminals and being arranged to face the printed circuit board 10, and a plurality of conductors 30 connecting the first terminals and the second terminals, respectively. The printed circuit board includes a plurality of transmission/reception electrodes 12, and beamforming ICs 20 receiving control signals from the TFT substrate via the first terminals and controlling phases of signals transmitted/received by transmission/reception electrodes based on the control signals. The TFT substrate includes a plurality of control circuits 90 that include TFTs and generate control signals for controlling the beamforming ICs, and a flattening multilayer 70 that covers the plurality of control circuits, wherein the flattening multilayer 70 include a plurality of recessed portions 80 each of which has an opening on a top face.

15 Claims, 23 Drawing Sheets

(56) References Cited

U.S. PATENT DOCUMENTS

| | | | | |
|---|---|---|---|---|
| 2024/0176439 | A1* | 5/2024 | Nihei | G06F 3/0412 |
| 2025/0105518 | A1* | 3/2025 | Pham | H01Q 1/523 |

FOREIGN PATENT DOCUMENTS

| | | | | |
|---|---|---|---|---|
| JP | 2022025914 | A | 2/2022 | |
| WO | 2019189151 | A1 | 10/2019 | |
| WO | WO-2021252036 | A1 * | 12/2021 | H01Q 3/26 |

* cited by examiner

PHASED ARRAY ANTENNA

BACKGROUND

1. Field

The present disclosure relates to a phased array antenna.

2. Description of the Related Art

Microwaves in a range of about 1 GHz to about 30 GHz are used in wireless communications such as wireless LAN, mobile phone communication networks, and satellite communications, because they can propagate a large amount of information. Since such high-frequency radio waves propagate with high directionality, beamforming technology is sometimes used to transmit and receive radio waves. For example, Japanese Patent Publication No. 2022-25914 discloses a phased array antenna that uses a liquid crystal layer for phase control.

SUMMARY

It is an object of the present disclosure to provide a phased array antenna with excellent reliability.

A phased array antenna according to one embodiment of the present disclosure is a phased array antenna that includes: a printed circuit board including a plurality of first terminals; and a TFT substrate including a plurality of second terminals and a plurality of third terminals, the TFT substrate being arranged relative to the printed circuit board in such a manner that the plurality of first terminals and the plurality of second terminals face, respectively, and are electrically connected, wherein the printed circuit board includes: a first substrate; a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes, and the TFT substrate includes: a second substrate; a plurality of control circuits that are formed on the second substrate and are connected to the plurality of second terminals and the plurality of third terminals, each control circuit including at least one TFT and generating a control signal that controls one of the plurality of beamforming ICs; a flattening multilayer arranged on the second substrate in such a manner that the flattening multilayer covers the plurality of control circuits and exposes the plurality of third terminals; and a plurality of recessed portions provided in the flattening multilayer, each recessed portion having an opening in a top face of the flattening multilayer.

According to one embodiment of the present disclosure, a phased array antenna with excellent reliability is provided.

DESCRIPTION OF THE EMBODIMENTS

Figure 1:
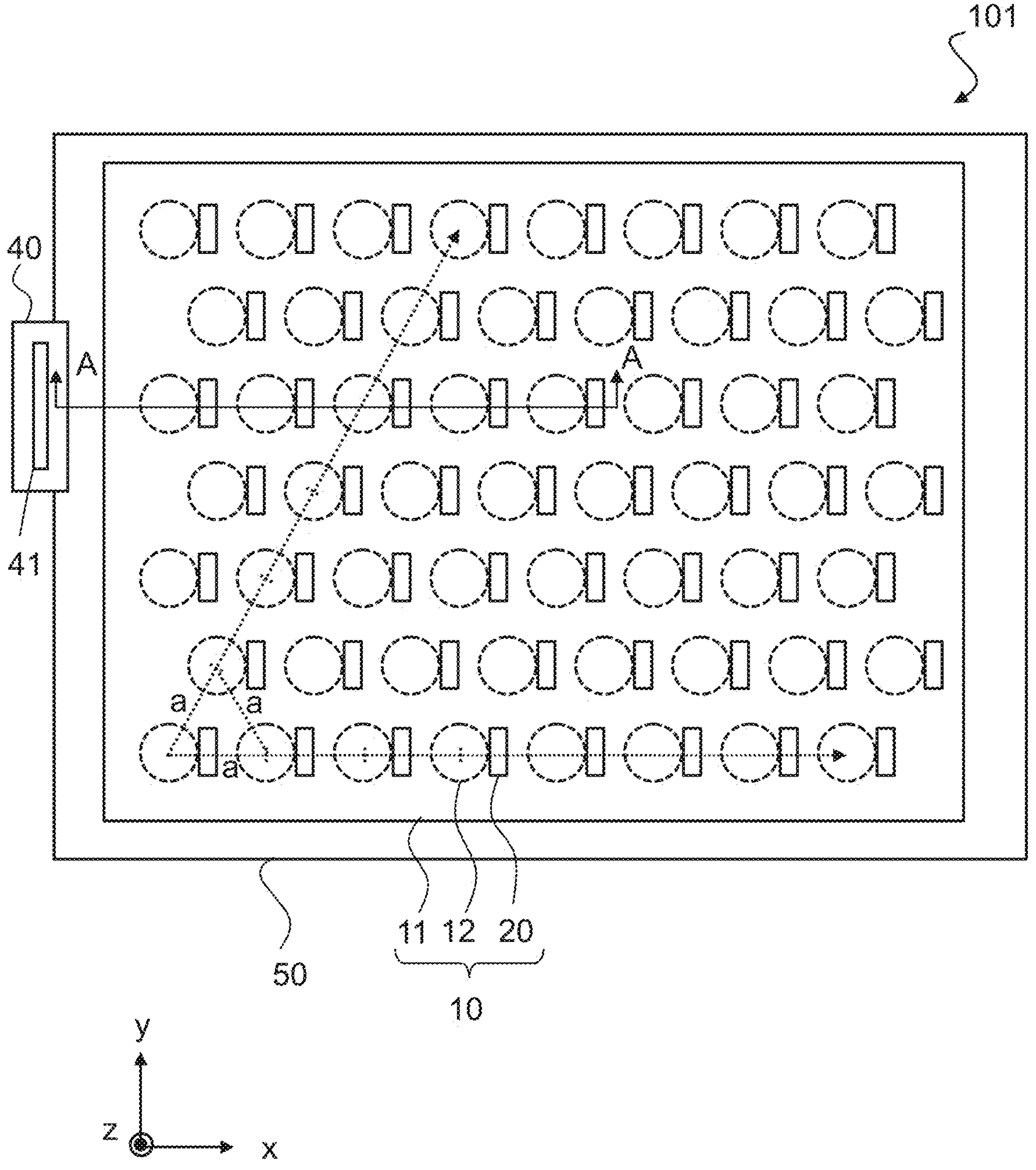
FIG. 1 is a plan view illustrating an exemplary phased array antenna of a first embodiment.

Embodiments of the present disclosure are described below with reference to the drawings. The present disclosure is not limited to the following embodiments, and design changes can be made as appropriate within the scope of satisfying the configuration of the present disclosure. In addition, in the following description, the same parts or parts having similar functions may be designated by the same reference numerals in different drawings, and repeated description thereof may be omitted. Furthermore, the configurations described in the embodiments and modified examples may be combined or modified as appropriate without departing from the scope of the present disclosure. To make the description easy to understand, in the drawings referred to hereinafter, the configurations may be simply illustrated or schematically illustrated, or the illustration of part of constituent members may be omitted. Further, dimension ratios of constituent members illustrated in the drawings do not necessarily indicate actual dimension ratios.

First Embodiment

Figure 2:
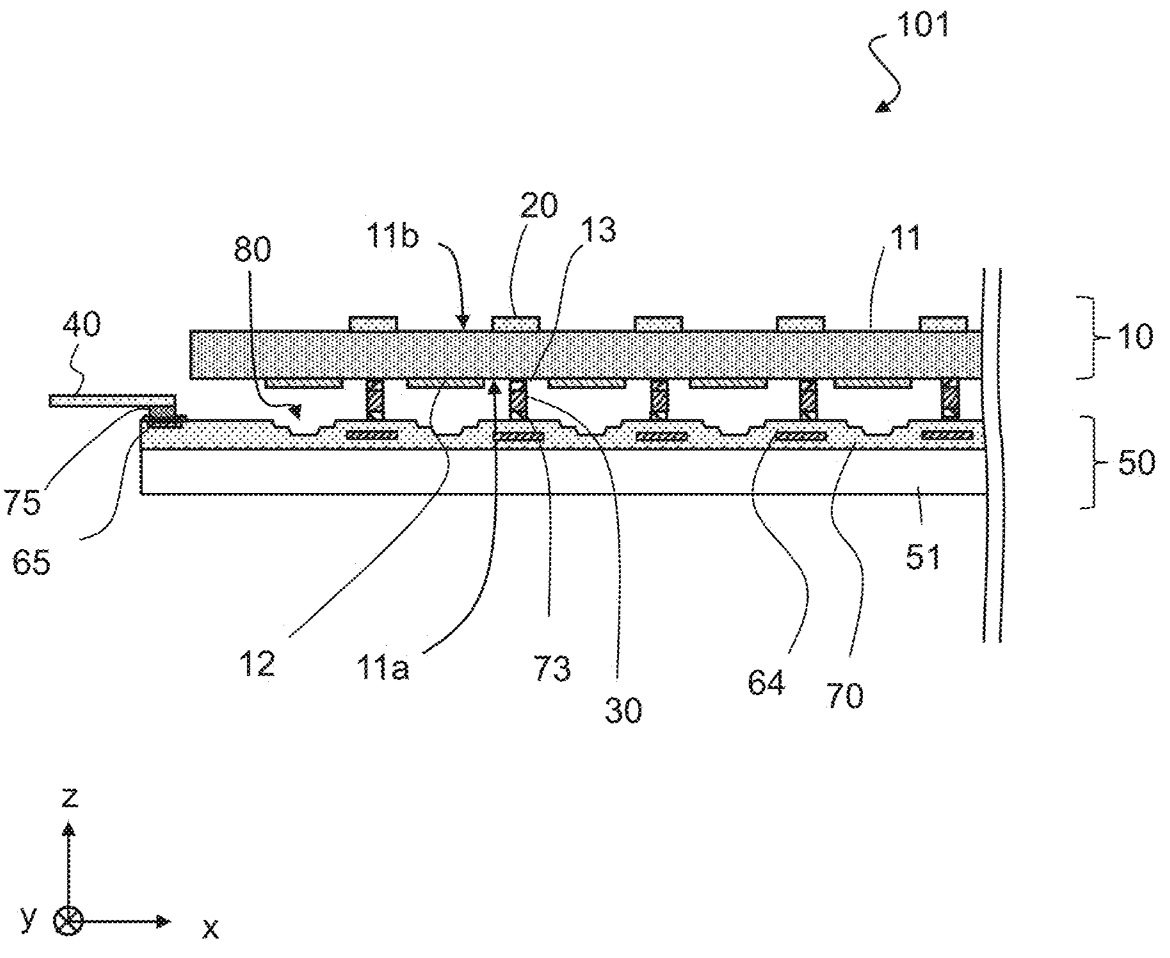
FIG. 2 is a cross-sectional view illustrating an exemplary phased array antenna of the first embodiment.

FIG. 1 is a schematic plan view of a phased array antenna 101 of the present embodiment, and FIG. 2 is a schematic cross-sectional view of the phased array antenna 101 taken along a line A-A in FIG. 1. The phased array antenna 101 includes a printed circuit board 10, a TFT substrate 50, and a plurality of conductors 30.

The printed circuit board 10 and the TFT substrate 50 are arranged to face each other. Specifically, on surfaces of the printed circuit board 10 and the TFT substrate 50 that face each other, a plurality of first terminals 13 and a plurality of second terminals 73 are provided, respectively. The plurality of first terminals 13 and the plurality of second terminals 73 face each other, respectively, and are electrically connected by the plurality of conductors 30.

The printed circuit board 10 includes a plurality of transmission/reception electrodes 12 for transmitting/receiving electromagnetic waves, and performs beamforming by adjusting the phases of the electromagnetic waves transmitted and received by the respective transmission/reception electrodes 12, as described later.

The TFT substrate 50 includes a plurality of control circuits and transmits various control signals for performing beamforming to the printed circuit board 10 via the conductors 30. Further, the TFT substrate 50 transmits transmission waves via the conductors 30 to the printed circuit board 10, and receives reception waves received by the printed circuit board 10, via the conductor 30 from the printed circuit board 10.

The TFT substrate 50 further includes a plurality of third terminals 67B, and a flexible substrate 40 is connected to the third terminals 67B via conductors 75, which allows transmission and reception of signals with an external circuit. ICs such as control ICs 41 may be mounted on the flexible substrate 40.

The TFT substrate 50 includes a flattening multilayer 70 on a surface that faces the printed circuit board 10. In order to form a wiring layer 64 that connects the plurality of control circuits and the plurality of second terminals 73 formed on the TFT substrate 50, in a different layer from the plurality of second terminals 73, the flattening multilayer 70 preferably includes at least two flattening layers.

As will be described later, the flattening multilayer 70 is thick and is located on one side of the TFT substrate 50, which can cause large stress in the TFT substrate 50. If large stress is generated by the flattening multilayer 70, the following problems may arise: the TFT substrate 50 may warp, making it impossible to properly bond the TFT substrate 50 to the printed circuit board 10; or large stress may be applied to bonding portions of any of the first terminals 13, the conductors 30, and the second terminals 73 located between the TFT substrate 50 and the printed circuit board 10, which may cause cracks or breakage of lines to occur. In addition, the stress of the TFT substrate 50 may be transmitted to the printed circuit board 10, which may reduce the reliability of the phased array antenna 101. Furthermore, due to a large thickness of the flattening multilayer 70, it may become difficult to form the second terminals 73 and the wiring layer 64 appropriately, which may also lead to a decrease in yield.

The phased array antenna 101 of the present disclosure includes a plurality of recessed portions 80 in the flattening multilayer 70 in order to solve such problems. The recessed portion includes, on its side face, a structure that can suppress such a decrease in reliability and a decrease in yield. Such a structure of the flattening multilayer 70 is described in more detail below.

The printed circuit board 10 includes a first substrate 11, a plurality of transmission/reception electrodes 12, and a plurality of beamforming ICs 20. The first substrate 11 has a first main surface 11*a* and a second main surface 11*b* located on the opposite side of the first main surface 11*a*. The first main surface 11*a* faces the TFT substrate 50. The printed circuit board 10 is, for example, a multilayer board in which a plurality of wiring layers and a base material layer are laminated. The base material layer is made of, for example, resin alone, or glass fiber impregnated with resin, and the wiring layer is formed by patterning a metal layer such as copper foil. The printed circuit board 10 may be a flexible substrate having flexibility.

The plurality of transmission/reception electrodes 12 are arranged one-dimensionally or two-dimensionally on the first main surface 11*a*. In the present embodiment, the plurality of transmission/reception electrodes 12 are arranged at the vertices of equilateral triangles with pitch a as one side along the x-axis direction. In other words, the plurality of transmission/reception electrodes 12 are arranged with pitch a along the x-axis direction and a direction at 60° with respect to the x-axis.

As illustrated in FIG. 1, each transmission/reception electrode 12 is a circular radiation conductor in the present embodiment. However, the transmission/reception electrode 12 may have a shape other than a circular shape, such as a rectangular shape. In addition, the plurality of transmission/reception electrodes 12 may be arranged, not at the vertices of equilateral triangles, but in a grid in the x-axis direction and the y-axis direction. When the phased array antenna 101 is used for communication in a band ranging from about 1 GHz to about 30 GHz, the diameter or the length of one side of a rectangle of the transmission/reception electrode 12 as a size thereof is, for example, about sub-millimeter to several millimeters.

The printed circuit board 10 further includes a plurality of power feeding elements that are electrically connected to the beamforming ICs 20 (described later) and feed transmission/reception signals to/from the transmission/reception electrodes 12, respectively. Each power feeding element may be, for example, a via conductor or a wiring pattern directly connected to the transmission/reception electrode 12, or it may be a strip conductor arranged at a position where it can be electromagnetically coupled with the transmission/reception electrode 12. The power feeding elements are formed inside the first substrate 11 or on the first main surface 11*a*. Each transmission/reception electrode 12 and the power feeding element corresponding to the same constitute one planar antenna. The plurality of planar antennas are arranged one-dimensionally or two-dimensionally to constitute an array antenna.

The plurality of beamforming ICs 20 are arranged on the second main surface 11*b* to be mounted on the first substrate 11. In the example shown in FIGS. 1 and 2, the beamforming ICs 20 are arranged so that the transmission/reception electrodes 12 and the beamforming ICs 20 do not overlap in plan view. The beamforming ICs 20, however, may be arranged to overlap with the transmission/reception electrodes 12 in plan view. Since the beamforming ICs 20 and the transmission/reception electrodes 12 are arranged on different main surfaces of the first substrate 11, respectively, the transmission/reception electrodes 12 can be arranged on the first main surface 11*a* without being constrained by the arrangement of the beamforming ICs 20. This makes it possible to increase the area of the transmission/reception electrodes 12 arranged on the first main surface 11*a*, or to increase the number of the transmission/reception electrodes 12.

In the present embodiment, one beamforming IC 20 controls the phase of one transmission/reception electrode 12. The configuration, however, may be such that one beamforming IC 20 controls the phases of two or more transmission/reception electrodes 12.

Figure 3:
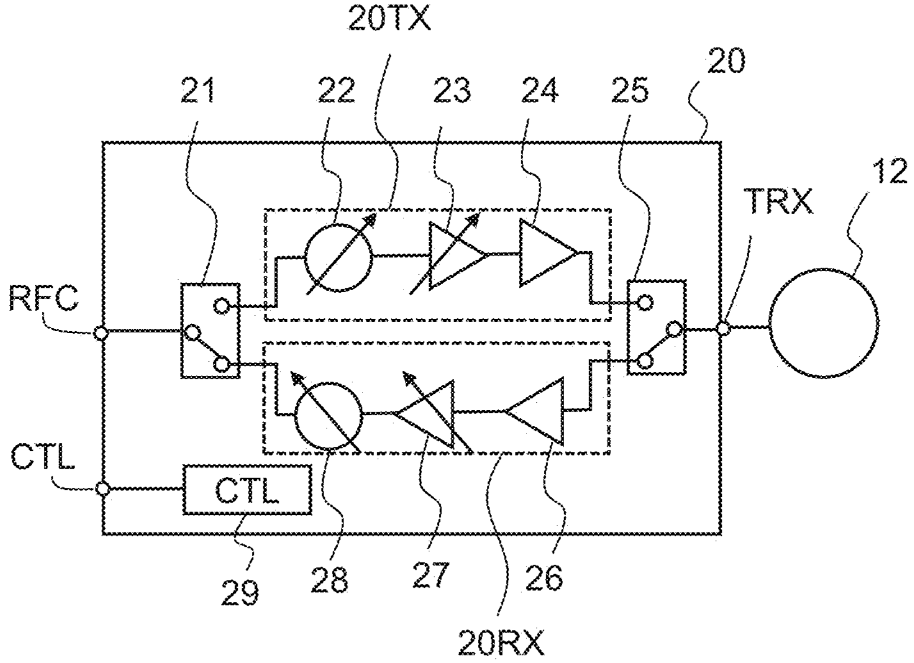
FIG. 3 is a block diagram illustrating a schematic configuration of a beamforming IC.

FIG. 3 is a block diagram illustrating a schematic configuration of the beamforming IC 20. The beamforming IC 20 includes, for example, an antenna switch 21, a phase shifter 22, a variable gain amplifier 23, a power amplifier 24, an antenna switch 25, a low noise amplifier 26, a variable gain amplifier 27, a phase shifter 28, and a controller 29. Furthermore, the beamforming IC 20 includes a transmission/reception terminal TRX, an RF signal terminal RFC, and a control terminal CTL.

The beamforming IC 20 receives a transmission signal from the TFT substrate 50 via the conductor 30, the first terminal 13, and the RF signal terminal RFC. When the antenna switches 21 and 25 select a transmission circuit 20TX, the phase of the transmission signal input from the RF signal terminal RFC is adjusted by the phase shifter 22, and the gain thereof is adjusted by the variable gain amplifier 23. The transmission signal whose phase and gain have been adjusted is amplified by the power amplifier 24 and radiated to the outside from the transmission/reception electrode 12.

The reception signal in the form of radio waves received by the transmission/reception electrode 12 is output to the TFT substrate 50 when the antenna switches 21 and 25 select a reception circuit 20RX. Specifically, the reception signal is amplified by the low noise amplifier 26, its gain is adjusted by the variable gain amplifier 27, and its phase is adjusted by the phase shifter 28. The reception signal whose phase and gain have been adjusted is output to the TFT substrate 50 via the RF signal terminal RFC, the first terminal 13, and the conductor 30.

The beamforming IC 20 receives a control signal via the conductor 30, the first terminal 13, and the control terminal CTL in order to perform the above-described operation. Examples of the control signal include clock signals, bias voltage signals, address signals, signals containing phase information, and the like. Although one control terminal CTL is shown in FIG. 3, the control terminal CTL is composed of multiple terminals so that it receives different types of signals. The controller 29 includes, for example, a memory, a temperature sensor, an interface, and a processor, and controls other block circuits of the beamforming IC 20, such as the antenna switch 21 and the phase shifter 22, based on the control signal.

Figure 4A:
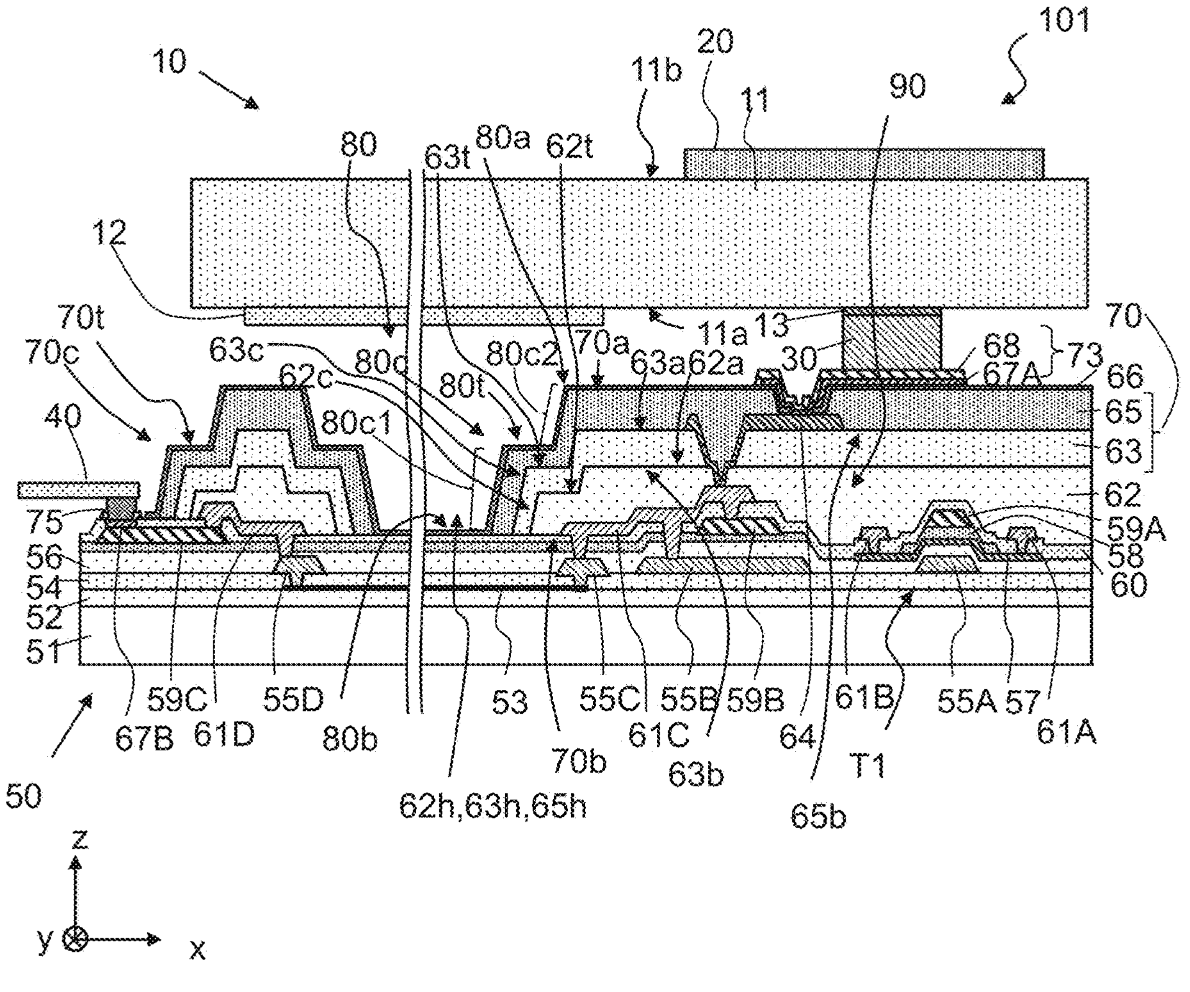
FIG. 4A is a cross-sectional view illustrating an exemplary TFT substrate of the phased array antenna.
Figure 5:
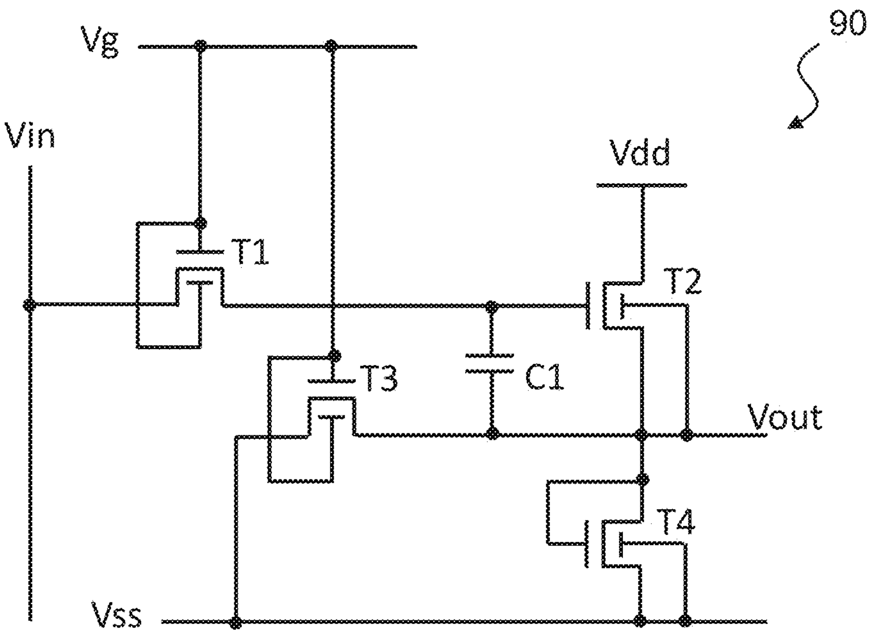
FIG. 5 is a circuit diagram illustrating an exemplary configuration of a control circuit.
Figure 6:
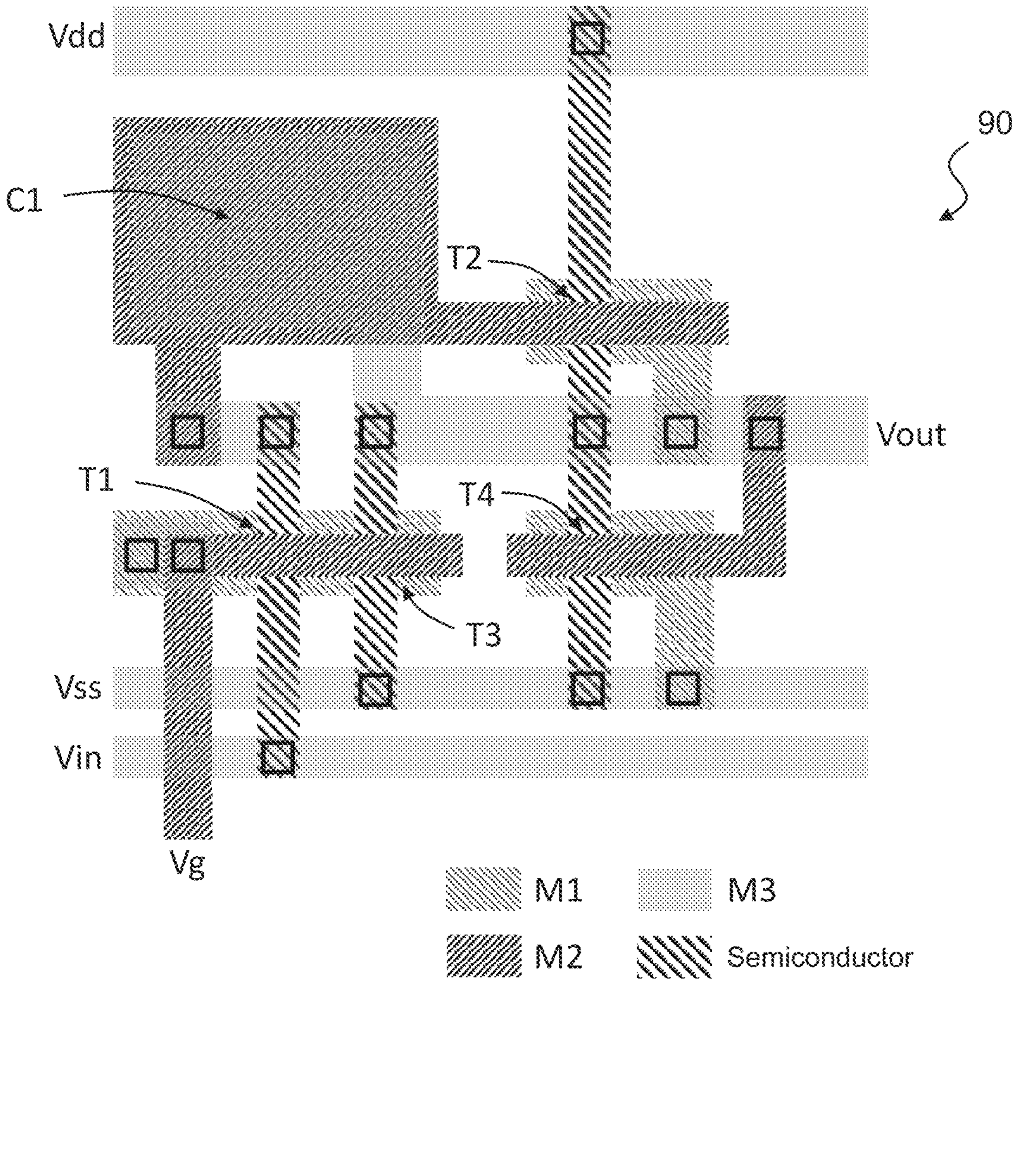
FIG. 6 illustrates an exemplary layout of the control circuit illustrated in FIG. 5.

FIG. 4A is a schematic cross-sectional view illustrating a part of an exemplary configuration of the TFT substrate 50. The TFT substrate 50 includes a control circuit that generates at least one of the control signals for controlling the beamforming IC 20 described above. This control circuit includes a TFT. In the present embodiment, the TFT substrate 50 includes, for example, a plurality of control circuits 90 for generating bias voltage signals for the respective beamforming ICs 20. FIG. 5 is a circuit diagram illustrating an exemplary configuration of the control circuit 90. FIG. 6 illustrates an exemplary layout of the circuit illustrated in FIG. 5.

The control circuit 90 includes a bias voltage generating circuit. The bias voltage generating circuit includes transistors T1 to T4. As detailed below in detail, the transistors T1 to T4 are TFTs, preferably with a double gate structure to increase reliability.

When a voltage is applied to Vg and the transistors T1 and T3 are on, a bias voltage signal with a magnitude corresponding to Vin is output from Vout. Furthermore, when Vg is at a zero volt level and the transistors T1 and T3 are off, a constant voltage determined by the capacitance accumulated in a capacitor C1 is output from Vout.

FIG. 4A illustrates the structure of the TFT substrate 50 in a cross section including the transistor T1 of the control circuit 90. The TFT substrate 50 includes a second substrate 51. The second substrate 51 is preferably made of an insulating material that is not substantially deformed by the heat to which the second substrate 51 is exposed during the manufacture of the TFT substrate 50. The second substrate 51 is, for example, a glass substrate. The second substrate 51 may be made of a material having a coefficient of thermal expansion comparable to that of the first substrate 11. For example, the second substrate 51 may be made of the same material as that of the base material layer of the first substrate 11.

When the printed circuit board 10 and the TFT substrate 50 are heated and bonded in the manufacturing process of the phased array antenna 101, if there is a large difference between the coefficient of thermal expansion of the first substrate 11 of the printed circuit board 10 and that of the second substrate 51 of the TFT substrate 50, a difference occurs between the amount of shrinkage of the first substrate 11 and that of the second substrate 51 when the phased array antenna 101 returns to room temperature after bonding. It is conceivable that this would cause a large stress to be generated near the first terminal 13 of the first substrate 11 and the second terminal 73 of the second substrate 51, or one of the printed circuit board 10 and the TFT substrate 50 to be warped, resulting in that due to the stress or the warpage, the phased array antenna 101 cannot fully demonstrate the desired performance, or reliability of the same may deteriorate. By selecting the materials of the first substrate 11 and the second substrate 51 so that the difference between the coefficient of thermal expansion of the first substrate 11 and that of the second substrate 51 is small, the occurrence of such a problem can be suppressed.

Alternatively, the second substrate 51 may be constituted by a flexible substrate made of polyimide resin or the like. The second substrate 51 may be made of glass, and the first substrate 11 may be constituted by a flexible substrate. If either the first substrate 11 or the second substrate 51 is constituted by a flexible substrate, even if there is a difference in the amount of expansion or shrinkage due to the difference between the coefficients of thermal expansion, the bending of the flexible substrate makes it possible to suppress stress from being applied to bonded parts and the substrates. In this case, from the viewpoint of ensuring the rigidity of the entire phased array antenna 101, it is preferable that the other of the first substrate 11 and the second substrate 51 is constituted by a rigid substrate rather than a flexible substrate.

The TFT substrate 50 includes a base coat layer 52, a resistance layer 53, an interlayer insulating layer 54, a first gate electrode 55A, wiring layers 55B, 55C, and 55D, a bottom gate insulating layer 56, a semiconductor layer 57, a top gate insulating layer 58, a second gate electrode 59A, wiring layers 59B and 59C, an interlayer insulating layer 60, wiring layers 61A, 61B, 61C, and 61D, a flattening multilayer 70, a wiring layer 64, a protective layer 66, an electrode layer 67A, a third terminal 67B, and a pad 68.

The base coat layer 52 is arranged on the main surface of second substrate 51. The base coat layer 52 adjusts the stress difference between the second substrate 51 and the laminate structure above the base coat layer 52. The base coat layer 52 is made of, for example, silicon oxide, and has a thickness of 100 nm. The base coat layer 52 may be made of silicon nitride.

The resistance layer 53 is located on the base coat layer 52. The resistance layer 53 is part of a voltage divider circuit formed on the TFT substrate 50, and the voltage divider circuit is included in the control circuit 90. The resistance layer 53 has a higher resistivity than good conductors such as copper and aluminum. For example, the resistance layer 53 is made of a transparent electrode material such as indium tin oxide, indium zinc oxide, or tin oxide, which has a resistivity of about several hundred μΩ·cm to several mΩ·cm.

The interlayer insulating layer 54 is located on the base coat layer 52, covering the resistance layer 53. The interlayer insulating layer 54 is made of, for example, silicon oxide, and has a thickness of 300 nm.

The first gate electrode 55A, as well as the wiring layers 55B, 55C, and 55D are arranged on the interlayer insulating layer 54. Of these, the wiring layers 55C and 55D are connected to the resistance layer 53 through contact holes provided in the interlayer insulating layer 54. The first gate electrode 55A, as well as the wiring layers 55B, 55C, and 55D are, for example, made of molybdenum and have a thickness of 260 nm. The first gate electrode 55A, as well as the wiring layers 55B, 55C, and 55D are indicated by M1 in FIG. 6.

The bottom gate insulating layer 56 is located on the interlayer insulating layer 54, covering the first gate electrode 55A as well as the wiring layers 55B, 55C, and 55D. The bottom gate insulating layer 56 has, for example, a laminate structure including a 50 nm thick silicon oxide layer and a 325 nm thick silicon nitride layer.

The semiconductor layer 57 is located so as to overlap the first gate electrode 55A in plan view. Preferably, the semiconductor layer 57 is made of amorphous silicon, low temperature polycrystalline silicon (LTPS), or an oxide semiconductor. As the oxide semiconductors, the following can be used: copper oxide; silver oxide; zinc oxide; gallium oxide; tin oxide; indium oxide; indium gallium zinc oxide; indium tin oxide; indium zinc oxide; titanium oxide; indium titanium oxide; and indium titanium zinc oxide. For example, the semiconductor layer 57 is, for example, made of indium gallium zinc oxide and has a thickness of 30 nm.

The low temperature polycrystalline silicon and the oxide semiconductor are characterized by high electron mobility and high driving ability, and have excellent response at high frequencies. In addition, a transistor including an oxide semiconductor is characterized by low leakage current when turned off.

The top gate insulating layer 58 is located on the semiconductor layer 57, covering at least the upper part of the first gate electrode 55A. The top gate insulating layer 58 is, for example, made of silicon oxide and has a thickness of 150 nm.

The second gate electrode 59A, as well as the wiring layers 59B and 59C are located on the top gate insulating layer 58. Of these, the second gate electrode 59A is located so as to overlap the first gate electrode 55A with the semiconductor layer 57 being interposed therebetween. The second gate electrode 59A as well as the wiring layers 59B and 59C have, for example, a three-layer structure of titanium/aluminum/titanium, in which the thickness of titanium is 30 nm each, and the thickness of aluminum is 300 nm.

The second gate electrode 59A, as well as the wiring layers 59B and 59C are indicated by M2 in FIG. 6.

The interlayer insulating layer 60 is located on the top gate insulating layer 58, covering the second gate electrode 59A as well as the wiring layers 59B and 59C. The interlayer insulating layer 60 has, for example, a laminate structure including a 200 nm thick silicon nitride layer and a 380 nm thick silicon oxide layer.

The wiring layers 61A, 61B, 61C, and 61D are located on the interlayer insulating layer 60. Each of the wiring layers 61A, 61B, 61C, and 61D has, for example, a laminate structure including a 630 nm thick copper layer and a 30 nm thick titanium layer. The wiring layers 61A and 61B are connected to the semiconductor layer 57 through contact holes provided in the interlayer insulating layer 60, respectively. Further, the wiring layer 61C is connected to the wiring layer 59B through a contact hole provided in the interlayer insulating layer 60, and is connected to the wiring layer 55B and the wiring layer 55C through contact holes provided in the interlayer insulating layer 60, the top gate insulating layer 58, and the bottom gate insulating layer 56. The wiring layer 61D is connected to the wiring layer 55D through a contact hole provided in the interlayer insulating layer 60, the top gate insulating layer 58, and the bottom gate insulating layer 56, and is connected to the wiring layer 59C through a contact hole provided in the interlayer insulating layer 60. The wiring layers 61A, 61B, 61C, and 61D are indicated by M3 in FIG. 6. The control circuit 90 is constituted by these wiring layers and TFTs.

The flattening multilayer 70 flattens the surface of the second substrate 51 on which a plurality of the control circuits 90 are formed in order to support the printed circuit board 10. Specifically, the flattening multilayer 70 is placed on the second substrate 51, in such a manner that it covers the plurality of control circuits 90 and exposes the third terminals 67B. More specifically, the flattening multilayer 70 is located on the interlayer insulating layer 60, covering the wiring layers 61A, 61B, 61C, and 61D.

The phased array antenna 101 includes a plurality of recessed portions 80 provided in the flattening multilayer 70, each recessed portion 80 having an opening 80*a* in the top face 70*a* of the flattening multilayer 70.

Figure 4B:
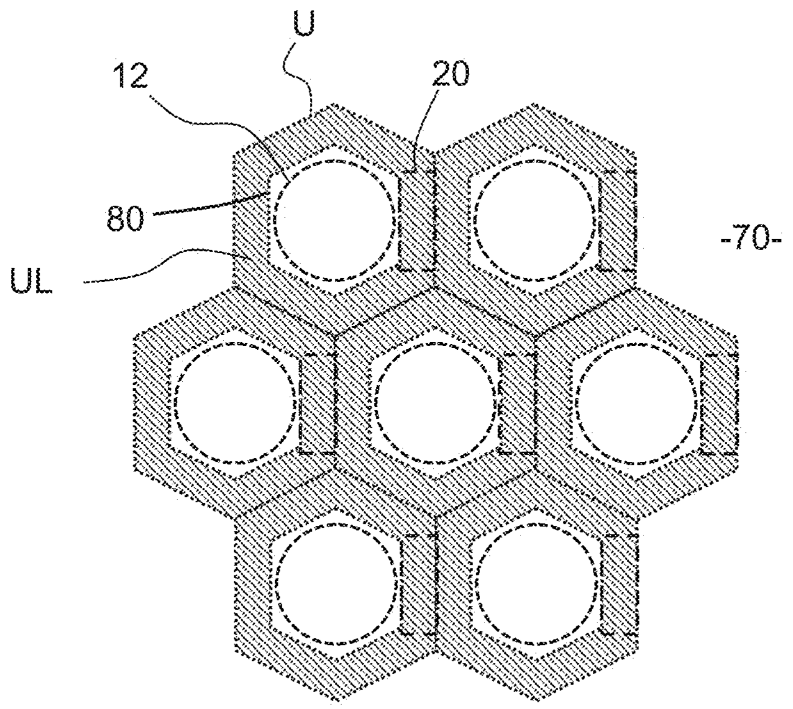
FIG. 4B is a plan view showing the positional relationship between recessed portions of the TFT substrate, and electrodes for transmission as well as beamforming ICs thereof.

As illustrated in FIG. 2, for example, the plurality of recessed portions 80 are arranged at positions that overlap the transmission/reception electrodes 12 arranged on the printed circuit board 10 in a plan view, that is, when viewed in the z-axis direction. FIG. 4B is a plan view illustrating the positional relationship between the plurality of recessed portions 80 provided in the flattening multilayer 70 of the TFT substrate 50, and the transmission/reception electrodes 12 as well as the beamforming ICs 20. A drive unit U including a control circuit 90 for driving the transmission/reception electrode 12 and the beamforming IC 20 that constitute one antenna element is arranged, for example, on the TFT substrate 50 in an area overlapping with the transmission/reception electrode 12 and the beamforming IC 20. As described above, in the present embodiment, the transmission/reception electrodes 12 are arranged at the vertices of a plurality of equilateral triangles spread all over the first main surface, and therefore the driving units U of the corresponding antenna elements also have a regular hexagonal shape in plan view. In the driving unit U, wiring layers 61A, 61B, 61C, and 61D of the control circuit 90 are arranged in a wiring region UL around the region of the recessed portion 80.

As shown in FIG. 4B, the wiring region UL can be secured adjacent to the six sides of a regular hexagon that are the outer edges of the recessed portion 80, but TFTs and the wiring layers 61A, 61B, 61C, 61D of the control circuit 90 may be arranged adjacent to all of the six sides, or may be arranged only adjacent to some of the six sides, such as one side or three sides, depending on the circuit scale and circuit pattern. Furthermore, the number and positions of the second terminals 73 can be set arbitrarily within the wiring region UL.

The recessed portion 80 has a side face 80*c* and a terrace 80*t* provided on the side face 80*c*. The recessed portion 80 further has the above-mentioned opening 80*a*, as well as a bottom 80*b*.

The terrace 80*t* is located, in the height direction, between the opening 80*a* and the bottom face 80*b* of the recessed portion 80, and divides the side face 80*c* into two faces, that is, a lower side face 80*c*1 and an upper side face 80*c*2. It may be expressed that the recessed portion 80 has a step on the side face 80*c*. In this case, the terrace 80*t* is a stair tread.

The terrace 80*t* is, for example, a flat face that forms an angle, for example, within +30° with respect to the surface of the second substrate 51. Further, a distance between a position at which the terrace 80*t* is in contact with the lower side face 80*c*1 and a position at which the terrace 80*t* is in contact with the upper side face 80*c*2, that is, the depth of the terrace 80*t*, is 1.0 μm or more and 4.0 μm or less, for example.

Figure 4C:
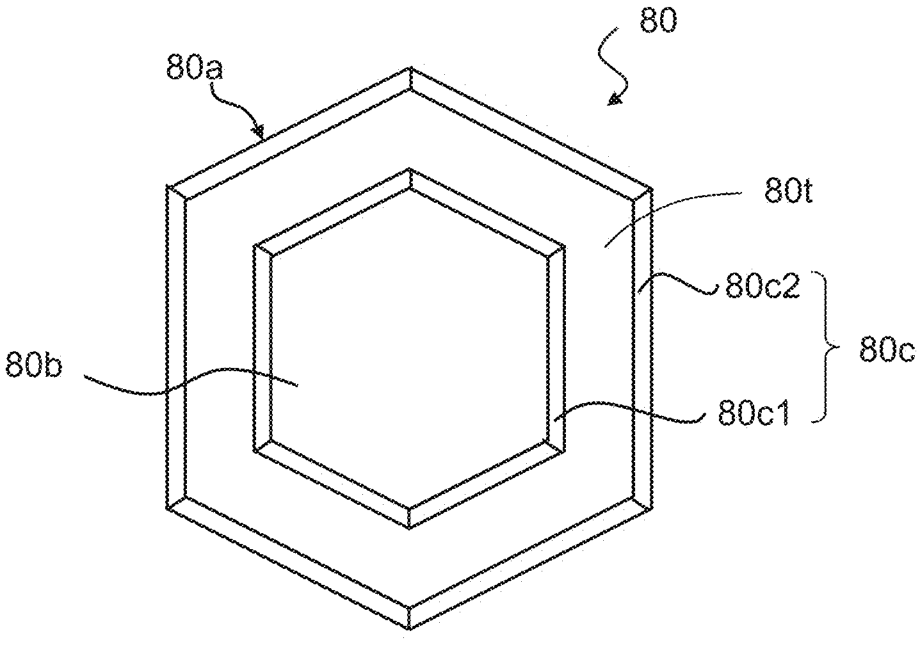
FIG. 4C is a plan view of the recessed portion of the TFT substrate.

FIG. 4C is a plan view of the recessed portion 80. The opening 80*a* and the bottom 80*b* of the recessed portion 80 each have a regular hexagonal shape. The terrace 80*t* has a link shape with a regular hexagonal outer shape, provided with a regular hexagonal hole.

In the present embodiment, the terrace 70*t* is provided also on the side face 70*c* of the outer edge of the flattening multilayer 70. The terrace 70*t* is located, in the height direction, between the top face 70*a* and the bottom face 70*b* of the flattening multilayer 70, and has the same characteristics as the terrace 80*t*, except for its shape.

By providing the plurality of recessed portions 80 in the flattening multilayer 70, the volume of the flattening multilayer 70 can be reduced by the portion corresponding to the space of the recessed portions 80, which makes it possible to reduce the stress in the flattening multilayer 70. Furthermore, since the recessed portions 80 located in the flattening multilayer 70 of the TFT substrate 50 in plan view and the transmission/reception electrodes 12 arranged on the printed circuit board 10 overlap in plan view, when the phased array antenna 101 transmits/receives radio waves from the TFT substrate 50 side, attenuation of the radio waves in the thick flattening multilayer 70 can be suppressed.

Still further, as will be described in detail below, with such a configuration that the flattening multilayer 70 has the terrace 80*t* on the side face 80*c*, when the side face 80*c* is covered with photoresist in the manufacturing process of the TFT substrate 50, the maximum thickness in the height direction of the photoresist can be reduced. This makes it possible to suppress resist remaining caused by exposure and development.

In order to form the wiring layer 64, which connects the plurality of control circuits 90 formed on the TFT substrate 50 with the plurality of second terminals 73, in a different layer from the layer in which the plurality of second terminals 73 are formed, the flattening multilayer 70 preferably includes two or more flattening layers. More specifically, the flattening multilayer 70 includes a first flattening layer 62 and a second flattening layer 63.

The first flattening layer 62 has a top face 62*a*, a bottom face 70*b*, and a side face 62*c*, and the second flattening layer 63 has a top face 63*a*, a bottom face 63*b*, and a side face 63*c*. The first flattening layer 62 is located on the second substrate 51, covering the plurality of control circuits 90, and the second flattening layer 63 covers the top face 62*a* and the side face 62*c* of the first flattening layer 62.

The first flattening layer 62 has a first terrace 62*t* on the side face 62*c*, and the second flattening layer 63 has a second terrace 63*t* on the side face 63*c*. In plan view, the second terrace 63*t* overlaps a part of the first terrace 62*t*, and a part of the second terrace 63*t* is located above the first terrace 62*t*.

In the present embodiment, the flattening multilayer 70 further includes a third flattening layer 65. The third flattening layer 65 has the top face 70*a*, the bottom face 65*b*, the side face 80*c*, and the terrace 80*t*, and covers the top face 63*a* and the side face 63*c* of the second flattening layer 63. The top face 70*a*, the side face 80*c*, and the terrace 80*t* are also the top face 70*a*, the side face 80*c*, and the terrace 80*t* of the flattening multilayer 70, respectively. In plan view, the terrace 70*t* overlaps a part of the second terrace 63*t* and a part of the first terrace 62*t*, and a part of the terrace 70*t* is located above the second terrace 63*t*.

Focusing on the recessed portion 80, the first flattening layer 62, the second flattening layer 63 and the third flattening layer 65 have a first through hole 62*h*, a second through hole 63*h* and a third through hole 65*h*, respectively, at the position of the recessed portion 80. As described above, the side face 62*c* is located within the first through hole 62*h*, and the side face 62*c* is covered by the side face 63*c*. Further, the side face 63*c* is covered by the side face 65*c*.

The side face 80*c* and the bottom 80*b* of the recessed portion 80 are covered by the protective layer 66. The interior of the recessed portion 80 is preferably hollow. In other words, the interior of the recessed portion 80 is preferably filled with the external environment such as air, and is preferably not filled with an insulator such as a resin or inorganic material, or a conductor such as a metal. This allows the formation of the recessed portions 80 to fully exert the effect of relieving stress in the flattening multilayer 70. In addition, since the recessed portion 80 is not filled with another insulator, the dielectric constant in the recessed portion 80 can be reduced.

The first flattening layer 62, the second flattening layer 63, and the third flattening layer 65 each have a thickness of approximately 1 μm or more and 4 μm or less, for example. More preferably, the maximum thickness of at least one of the first flattening layer 62, the second flattening layer 63, and the third flattening layer 65 is 2 μm or more. Since the maximum thickness is 2 μm or more, the upper surface of the second substrate 51 can be flattened, even if large irregularities are formed due to a plurality of control circuits 90 formed thereon.

The first flattening layer 62, the second flattening layer 63, and the third flattening layer 65 are preferably made of an organic material, that is, a synthetic resin. An organic material has a lower dielectric constant than inorganic materials, which reduces the capacitance between wiring layers and suppresses parasitic capacitance. Specifically, the first flattening layer 62, the second flattening layer 63, and the third flattening layer 65 preferably contain acrylic resin or polyimide resin as a main component, and are more preferably made of polyimide resin. Polyimide resin has a lower dielectric loss tangent than other resins such as acrylic resin. Therefore, by forming the first flattening layer 62, the second flattening layer 63, and the third flattening layer 65 with polyimide resin, dielectric loss can be reduced when the wiring layer transfers a transmission signal or a reception signal.

The wiring layer 64 is located on the second flattening layer 63, in the form illustrated in FIG. 4A. The wiring layer 64 has, for example, a laminate structure including a 630 nm thick copper layer and a 30 nm thick titanium layer. The wiring layer 64 is connected to the wiring layer 61C through a contact hole provided in the first flattening layer 62 and the second flattening layer 63. The wiring layer 64 is located in the wiring region UL around the recessed portion 80.

The protective layer 66 is located to cover the entire structure of the main surface of the second substrate 51 including the third flattening layer 65. The protective layer 66 is, for example, made of silicon nitride and has a thickness of 200 nm.

The electrode layer 67A and the third terminal 67B are, for example, made of indium zinc oxide and have a thickness of 125 nm. The electrode layer 67A is connected to the wiring layer 64 through a contact hole provided in the protective layer 66 and the third flattening layer 65, and the third terminal 67B is connected to the wiring layer 59C through a contact hole provided in the protective layer 66.

The pad 68 is located on the third terminal 67B. The pad 68 has, for example, a laminate structure including a 300 nm thick copper layer and a 30 nm thick titanium layer. The pad 68 and the electrode layer 67A constitute the second terminal 73. With the connection between the conductor 30 and the second terminal 73, the printed circuit board 10 and the TFT substrate 50 are electrically connected, and a transmission signal and a reception signal are transferred between the printed circuit board 10 and the TFT substrate 50. In addition, control signals for controlling the beamforming ICs 20 are transferred from the TFT substrate 50 to the printed circuit board 10.

The third terminal 67B is connected to the flexible substrate 40 via the conductor 75, and transfers a transmission signal, a reception signal, and a control signal to a communication unit outside the phased array antenna 101.

In the present embodiment, the TFT substrate 50 includes the first flattening layer 62 and the second flattening layer 63, but these may be formed integrally. Further, each of the wiring layers, the first gate electrode, the second gate electrode, and the electrode layer may be constituted by one or more layers of molybdenum, aluminum, titanium, and copper, or may be constituted by a layer of an alloy of these.

As described with reference to FIG. 4A, the transistor T1 has a double gate structure having the first gate electrode 55A and the second gate electrode 59A The transistors T2, T3, and T4 preferably also have a double gate structure, as illustrated in FIG. 6. Similar to the transistor T1, the transistors T2, T3, and T4 can also be constituted by wiring layers denoted by M1 and M2 formed at the same time as the first gate electrode 55A and the second gate electrode 59A. Further, the capacitor C1 can be formed by, for example, a wiring layer denoted by M2 formed at the same time as the second gate electrode 59A as well as the wiring layers 59B and 59C, a wiring layer denoted by M3 formed at the same time as the wiring layers 61A, 61B, 61C, and 61D, and an interlayer insulating layer 60 located between these.

Next, a method for manufacturing the TFT substrate 50 is described. The TFT substrate 50 can be manufactured using general semiconductor device manufacturing technology. An exemplary method for manufacturing the TFT substrate 50 is described, with reference to FIGS. 7 to 17.

Figure 7:
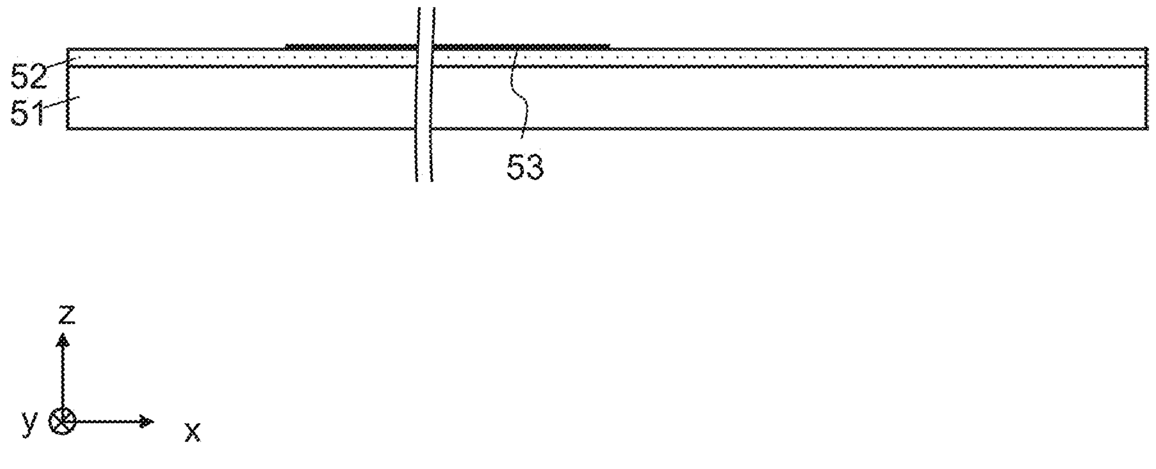
FIG. 7 is a process cross-sectional view illustrating a method for manufacturing the TFT substrate.

First, as illustrated in FIG. 7, a base coat layer 52 made of silicon oxide having a thickness of 100 nm is formed on a second substrate 51 made of glass, using a CVD device. Next, using a sputtering device, an 80 nm thick indium zinc oxide film is formed. By patterning the indium zinc oxide film, a resistance layer 53 is obtained.

Figure 8:
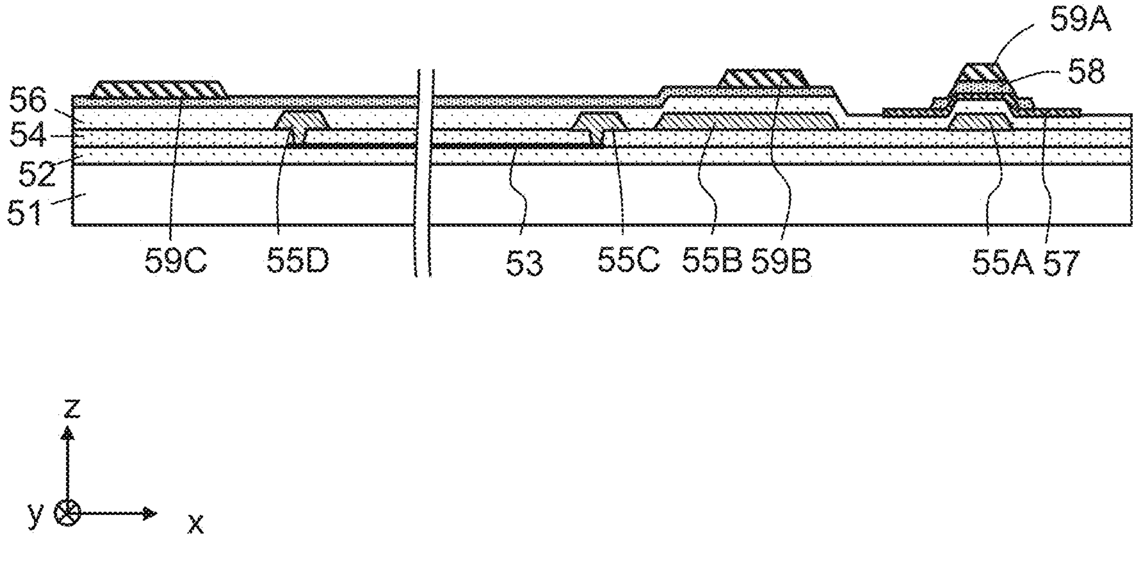
FIG. 8 is a process cross-sectional view illustrating the method for manufacturing the TFT substrate.

As illustrated in FIG. 8, an interlayer insulating layer 54 made of silicon oxide having a thickness of 300 nm is formed on the resistance layer 53 and the base coat layer 52, using a CVD device.

After a contact hole exposing a part of the resistance layer 53 is formed in the interlayer insulating layer 54, a 260 nm thick molybdenum film is formed in the contact hole and on the interlayer insulating layer 54, using a sputtering device. By patterning the molybdenum film, a first gate electrode 55A, as well as wiring layers 55B, 55C, and 55D are formed.

Next, using a CVD device, a bottom gate insulating layer 56 including a 50 nm thick silicon oxide film and a 325 nm thick silicon nitride film is formed on the interlayer insulating layer 54, the first gate electrode 55A, as well as the wiring layers 55B, 55C, and 55D. Thereafter, a 30 nm thick indium gallium zinc oxide film is formed on the bottom gate insulating layer 56 using a sputtering device, and it was annealed and patterned, whereby a semiconductor layer 57 is formed.

A 150 nm thick silicon oxide film is formed on the semiconductor layer 57 and the bottom gate insulating layer 56 using a CVD device, and the silicon oxide film was annealed, whereby a top gate insulating layer 58 is formed. A 30 nm thick titanium film, a 300 nm thick aluminum film, and a 30 nm thick titanium film are sequentially formed on the top gate insulating layer 58 using a sputtering device, and they are patterned, whereby a second gate electrode 59A as well as wiring layers 59B and 59C are formed.

Figure 9:
FIG. 9 is a process cross-sectional view illustrating the method for manufacturing the TFT substrate.

As illustrated in FIG. 9, an interlayer insulating layer 60 including a 200 nm thick silicon nitride film and a 380 nm thick silicon oxide film is formed on the second gate electrode 59A, the wiring layers 59B, 59C, and the top gate insulating layer 58, using a CVD device.

Contact holes that expose parts of the wiring layers 59B, 55B, 55C, 55D, and 59C are formed in the interlayer insulating layer 60, the top gate insulating layer 58, and the bottom gate insulating layer 56, and thereafter, a 630 nm thick copper film and a 30 nm thick titanium film are formed in the contact holes and on the interlayer insulating layer 60. The copper film and the titanium film are patterned, whereby wiring layers 61A, 61B, 61C, and 61D are formed. As a result, a plurality of control circuits 90 are formed on the second substrate 51.

Next, a flattening multilayer 70 that includes a wiring layer 64 and in which recessed portions 80 are formed is formed. The flattening multilayer 70 includes a first flattening layer 62, a second flattening layer 63, and a third flattening layer 65, each of which is constituted by a 1 μm to 4 μm thick film made of acrylic resin or polyimide resin.

Figure 10:
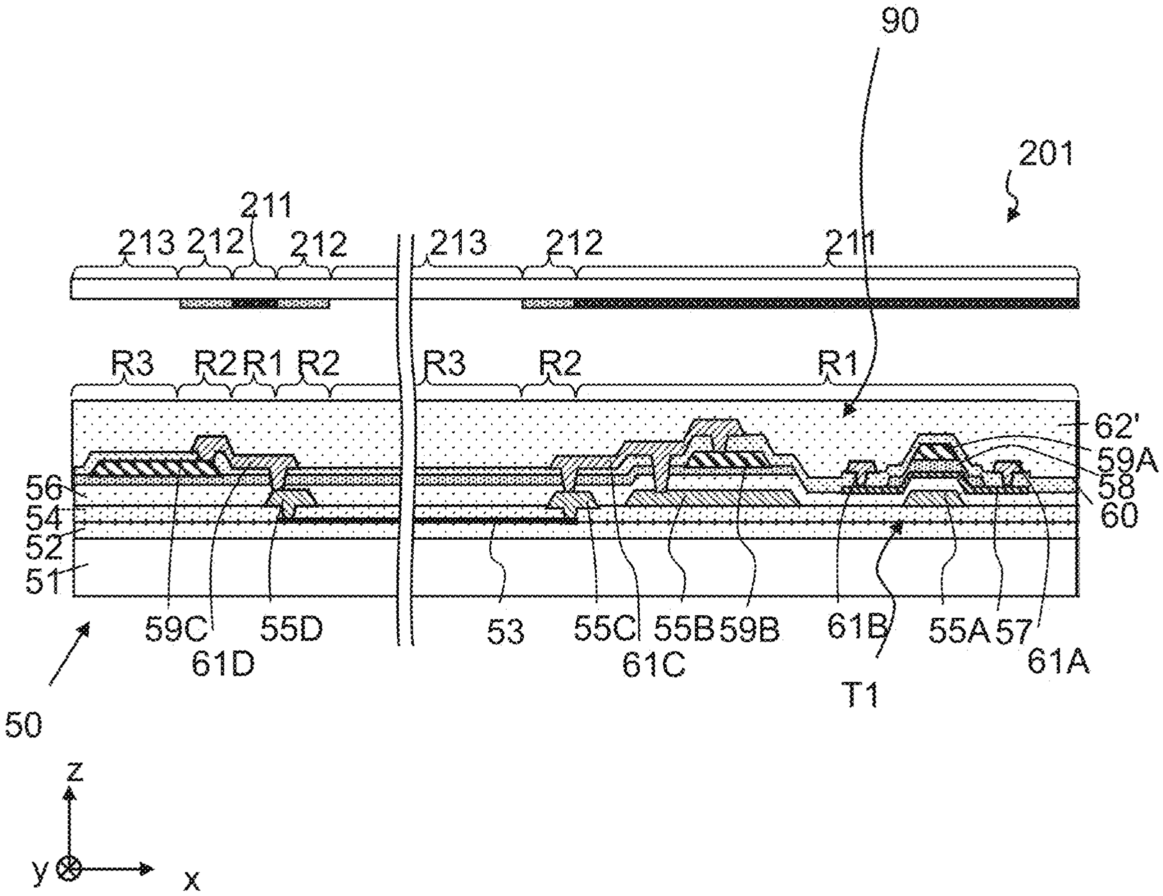
FIG. 10 is a process cross-sectional view illustrating the method for manufacturing the TFT substrate.

First, as illustrated in FIG. 10, an uncured first flattening layer 62' is formed by coating on the second substrate 51 so as to cover the control circuit 90, and the uncured first flattening layer 62' is exposed using a multi-tone mask 201. The multi-tone mask 201 is also called a gray-tone mask or a half-tone mask, and has a light-shielding part 211 that blocks exposure light, a semi-transmissive part 212 that blocks part of the exposure light, and a transmissive part 213 that does not block the exposure light. In the present embodiment, the light transmittance in the semi-transmissive part 212 is approximately uniform over the entire region of the semi-transmissive part 212. However, the transmittance of the semi-transmissive part 212 may have a non-uniform distribution.

By performing exposure using the multi-tone mask 201, light is substantially blocked in a region R1, a sufficient amount of light to remove the uncured first flattening layer 62' is applied to a region R3, and an amount of light at a level of removing a part of the uncured first flattening layer 62' is applied to a region R2.

Figure 11:
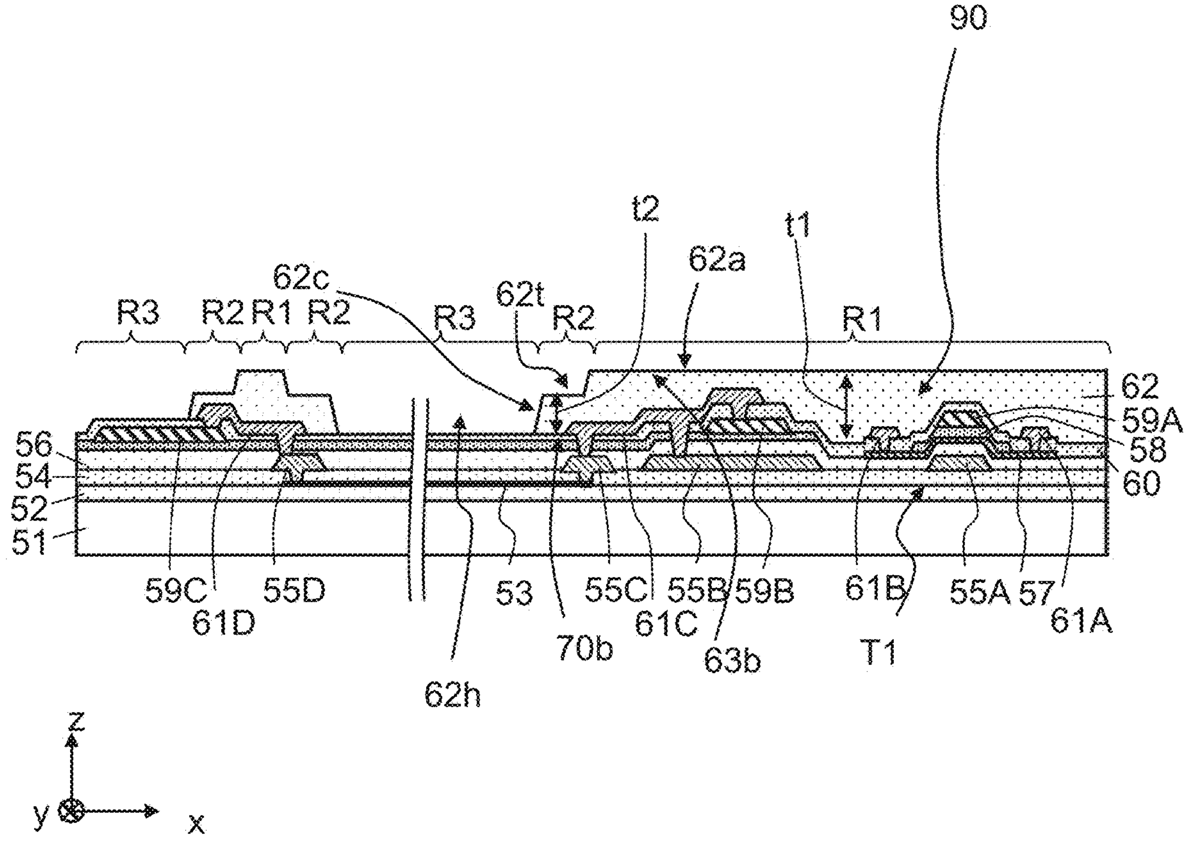
FIG. 11 is a process cross-sectional view illustrating the method for manufacturing the TFT substrate.

Thereafter, the uncured first flattening layer 62' is developed and heat-treated to obtain the first flattening layer 62 as shown in FIG. 11. The first flattening layer 62 has a maximum thickness of t1 in the region R1, and has a maximum thickness of t2 that is smaller than t1 in the region R2. Furthermore, in the region R3, the first flattening layer 62 is not formed, and the interlayer insulating layer 60 is exposed. By having such a thickness distribution, the first flattening layer 62 has a top face 62*a*, a bottom face 70*b*, a side face 62*c*, and a first terrace 62*t* located on the side face 62*c*. Of a region where the interlayer insulating layer 60 is exposed, a portion surrounded by the side face 62*c* becomes a first through hole 62*h*.

Figure 12:
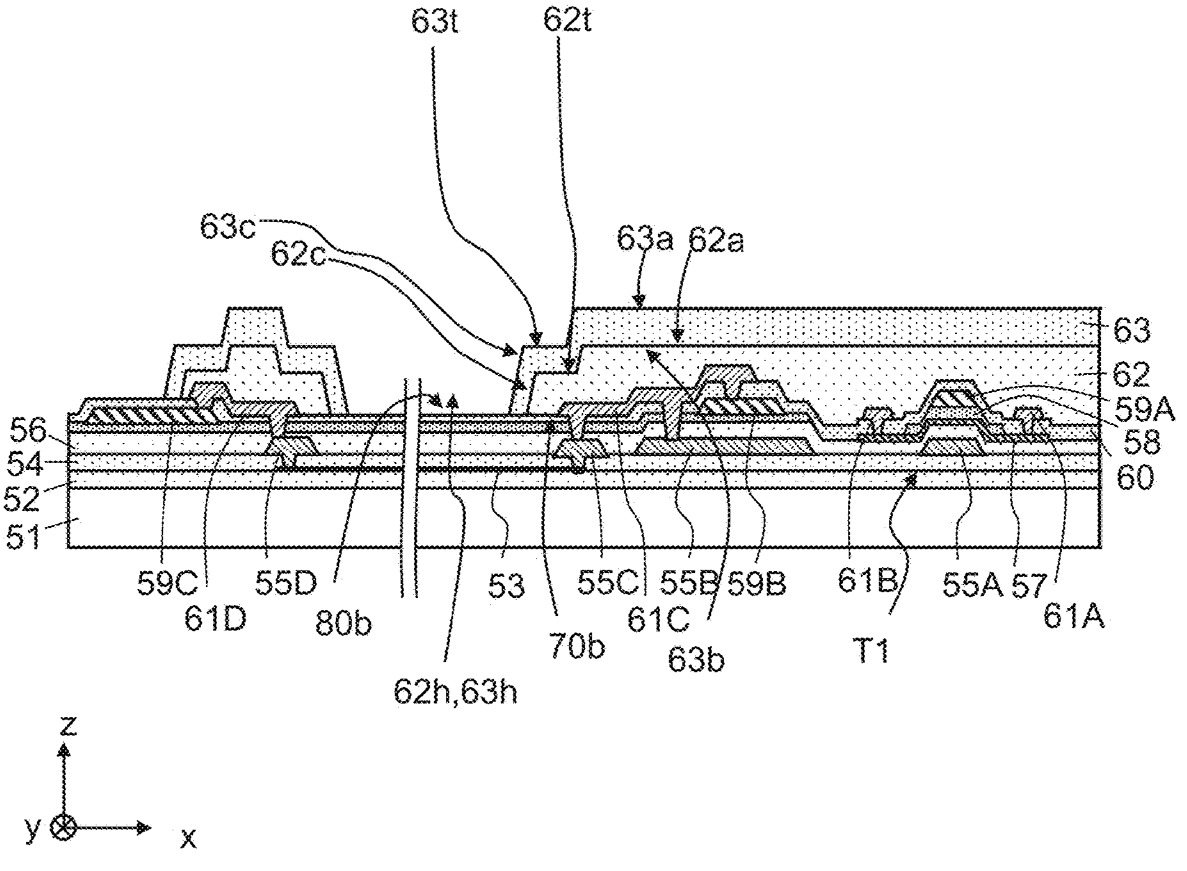
FIG. 12 is a process cross-sectional view illustrating the method for manufacturing the TFT substrate.

As illustrated in FIG. 12, using a similar photolithography technique, a second flattening layer 63 having a top face 63*a*, a bottom face 63*b*, a side face 63*c*, and a second terrace 63*t* located on the side face 63*c* is formed on the first flattening layer 62. A second through hole 63*h* is formed in the second flattening layer 63 so as to overlap with the first through hole 62*h*.

Figure 13:
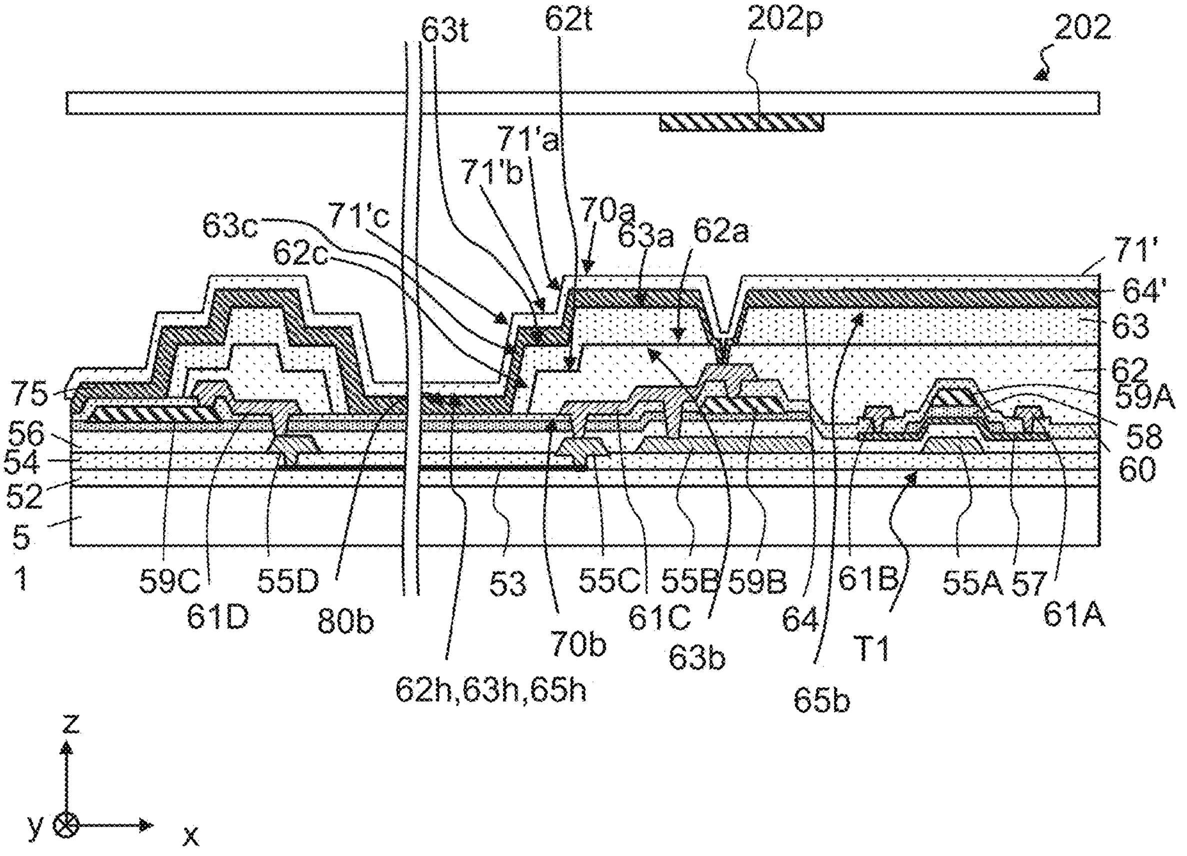
FIG. 13 is a process cross-sectional view illustrating the method for manufacturing the TFT substrate.

As illustrated in FIG. 13, a contact hole exposing a part of the wiring layer 61C is formed in the first flattening layer 62 and the second flattening layer 63, and a metal film 64' is formed on the second flattening layer 63, in the contact hole, and on a part of the interlayer insulating layer 60. Further, an uncured resist film 71' is formed thereon. The metal film 64' includes, for example, a 630 nm thick copper layer and a 30 nm thick titanium layer.

At this time, since the second terrace 63*t* is formed on the side face 63*c* of the second flattening layer 63, the uncured resist film 71' formed on the side face 63*c* of the second flattening layer 63 is divided into two parts, an inclined part 71'*a* and an inclined part 71'*c*, by a horizontal part 71'*b* formed on the second terrace 63*t*.

Figure 14:
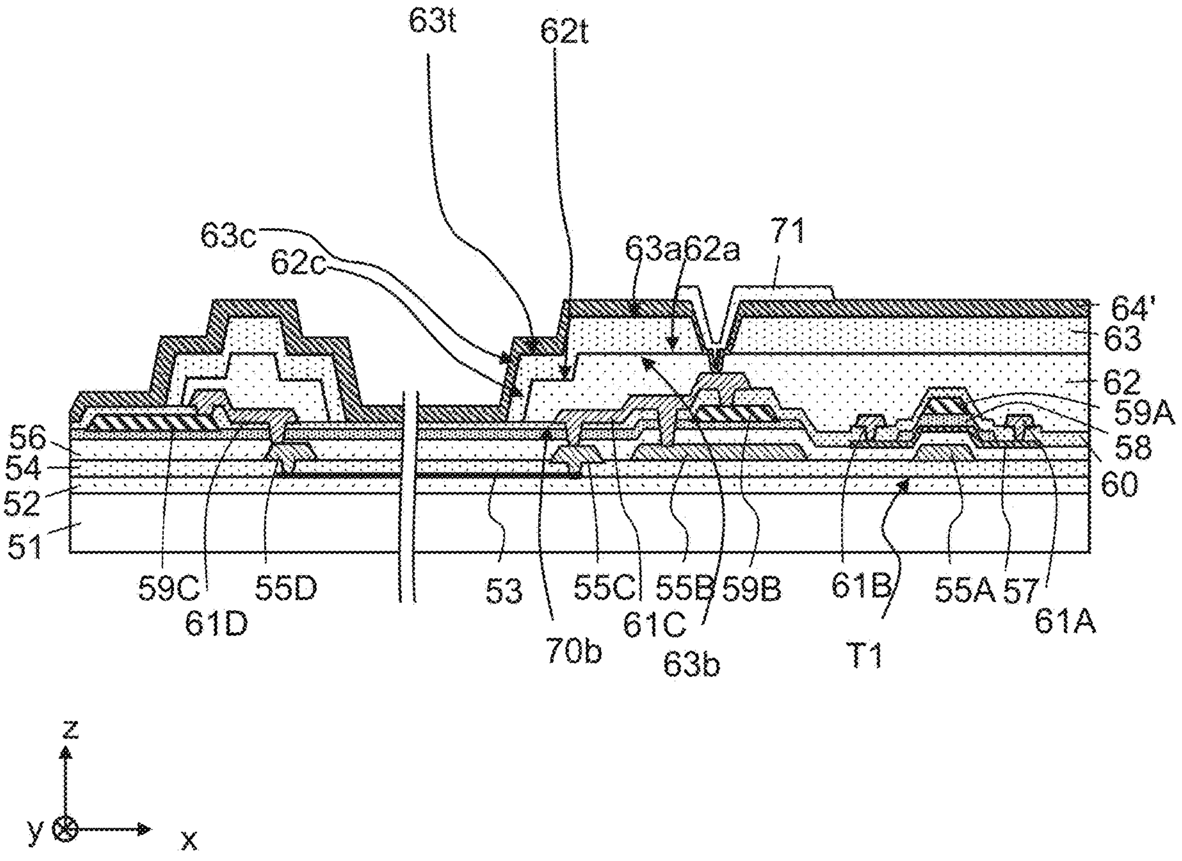
FIG. 14 is a process cross-sectional view illustrating the method for manufacturing the TFT substrate.

Using an exposure mask 202 having a pattern 202*p* corresponding to the wiring layer 64, the uncured resist film 71' is exposed and developed. The uncured resist film 71' on the side face 63*c* of the second flattening layer 63 is divided into two parts, the inclined part 71'*a* and the inclined part 71'*c*, by the horizontal part 71'*b*. Therefore, the maximum thickness in the vertical direction (y-axis direction) of the uncured resist film 71' on the side face 63*c* is smaller than when the horizontal part 71'*b* is not formed, that is, when the second terrace 63*t* is not formed. As a result, this prevents the amount of light from becoming insufficient during exposure, which prevents the resist film from remaining. Thereby, as illustrated in FIG. 14, the resist pattern 71 can be formed without any resist remaining on the side face 63*c*.

Figure 15:
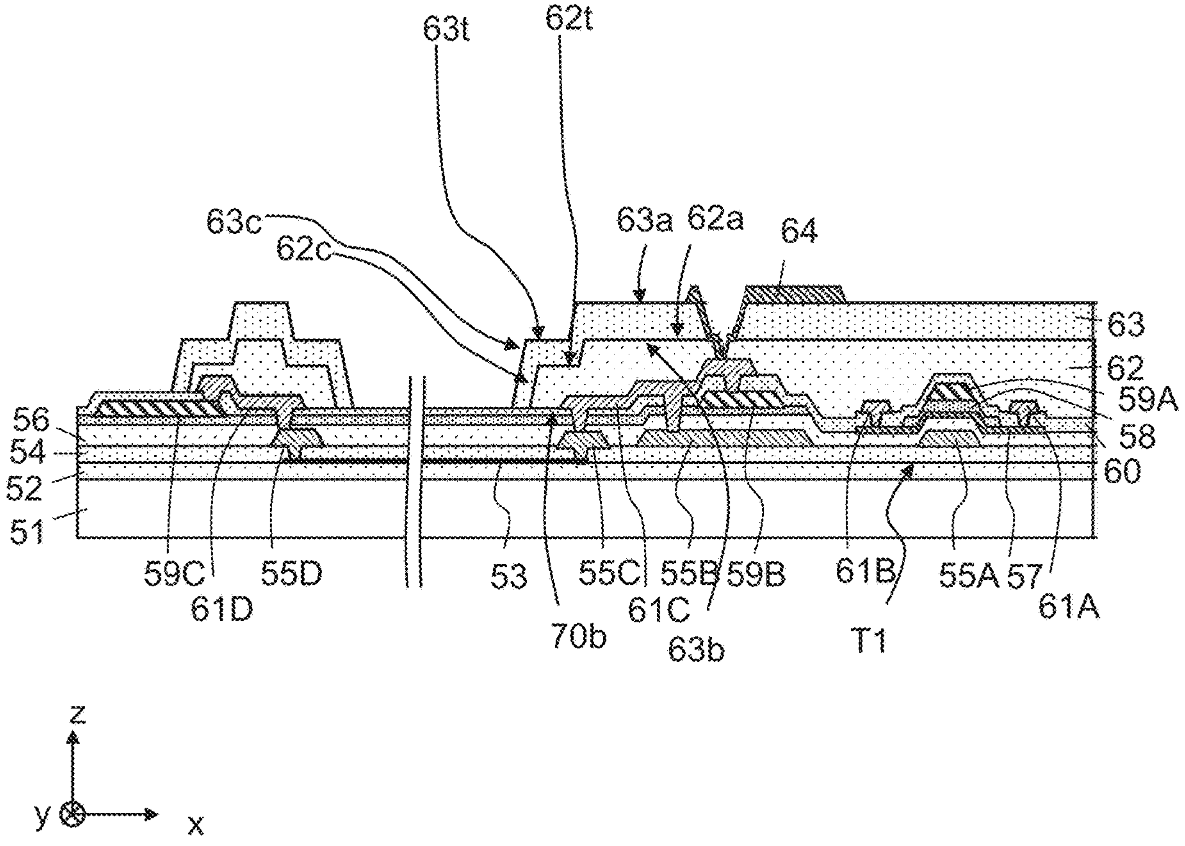
FIG. 15 is a process cross-sectional view illustrating the method for manufacturing the TFT substrate.

Subsequently, the metal film 64' is etched by dry etching or the like using the resist pattern 71 as a mask, thereby forming the wiring layer 64 as shown in FIG. 15.

Figure 16:
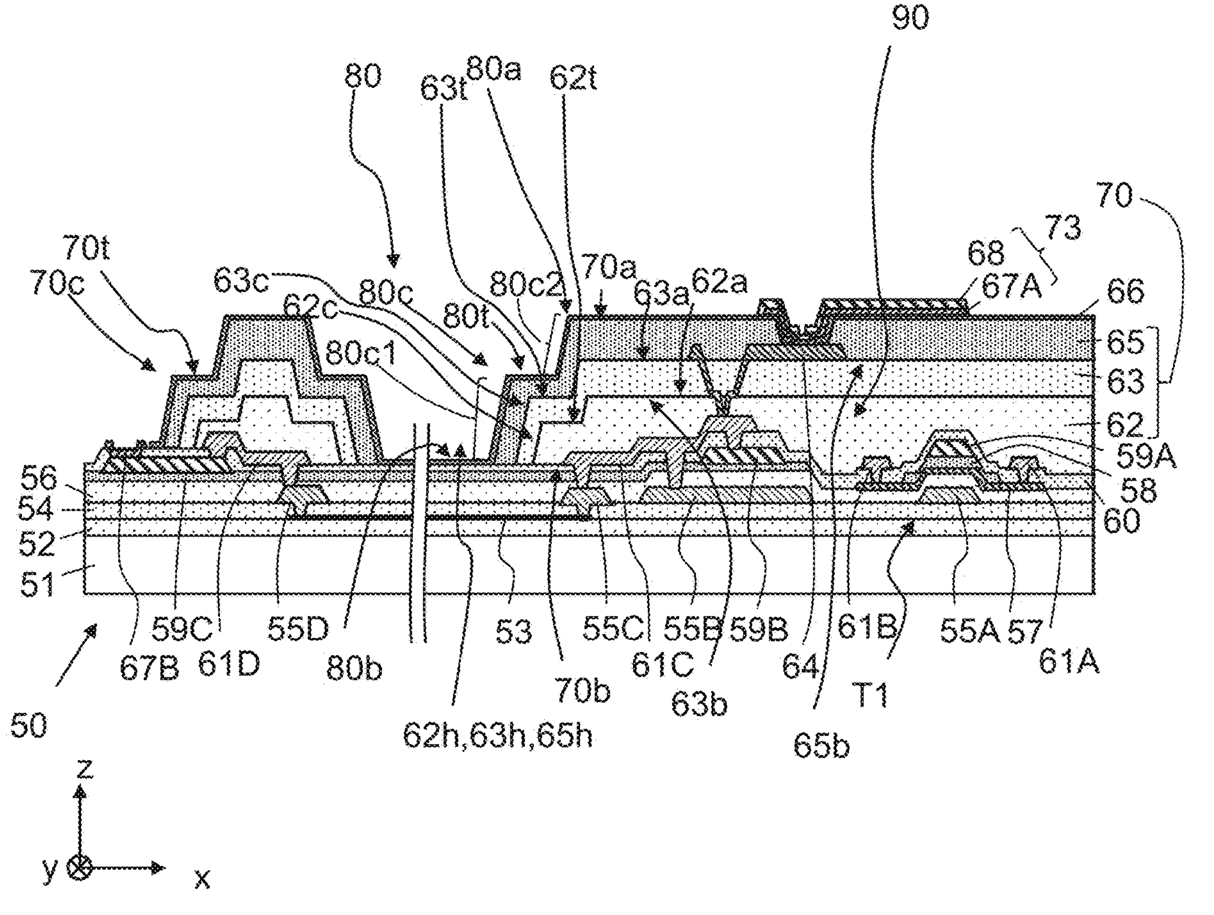
FIG. 16 is a process cross-sectional view illustrating the method for manufacturing the TFT substrate.

As illustrated in FIG. 16, a third flattening layer 65 is formed by applying and patterning an acrylic or polyimide resin to a thickness of 1 μm to 4 μm on the wiring layer 64 and the second flattening layer 63. The third flattening layer 65 can be formed using a photolithography technique similar to that for the first and second flattening layers 62 and 63. On the side face 80*c* of the third flattening layer 65, a terrace 80*t* is formed. A third through hole 65*h* is formed in the third flattening layer 65 so as to overlap with the second through hole 63*h*.

Using a CVD device, a 200 nm thick silicon nitride film is formed on the third flattening layer 65, and a contact hole that exposes a part of the wiring layer 64 is formed on the silicon nitride film, the third flattening layer 65, and the second flattening layer 63, whereby a protective layer 66 is formed. Further, a contact hole is formed in the interlayer insulating layer 60 exposed from the flattening multilayer 70 to expose a part of the wiring layer 59C.

Using a sputtering device, a 125 nm thick indium zinc oxide film is formed in the contact hole as well as on the interlayer insulating layer 60 and the protective layer 66, and is patterned to form the electrode layer 67A and the third terminal 67B. Further, using a sputtering device, a 300 nm thick copper film and a 30 nm thick titanium film are formed on the electrode layer 67A and the protective layer 66, and these films are patterned to form a pad 68. As a result, the TFT substrate 50 provided with the second terminals 73 is completed.

Also when the electrode layer 67A and the pad 68 that constitute the second terminal 73 are formed, the maximum thickness in the vertical direction (y-axis direction) of the resist film located on the side face 80*c* is reduced by the terrace 80*t* thus formed. Thereby, the electrode layer 67A and the pad 68 can be formed in a correct pattern without any resist remaining on the side face 80*c*.

Figure 17:
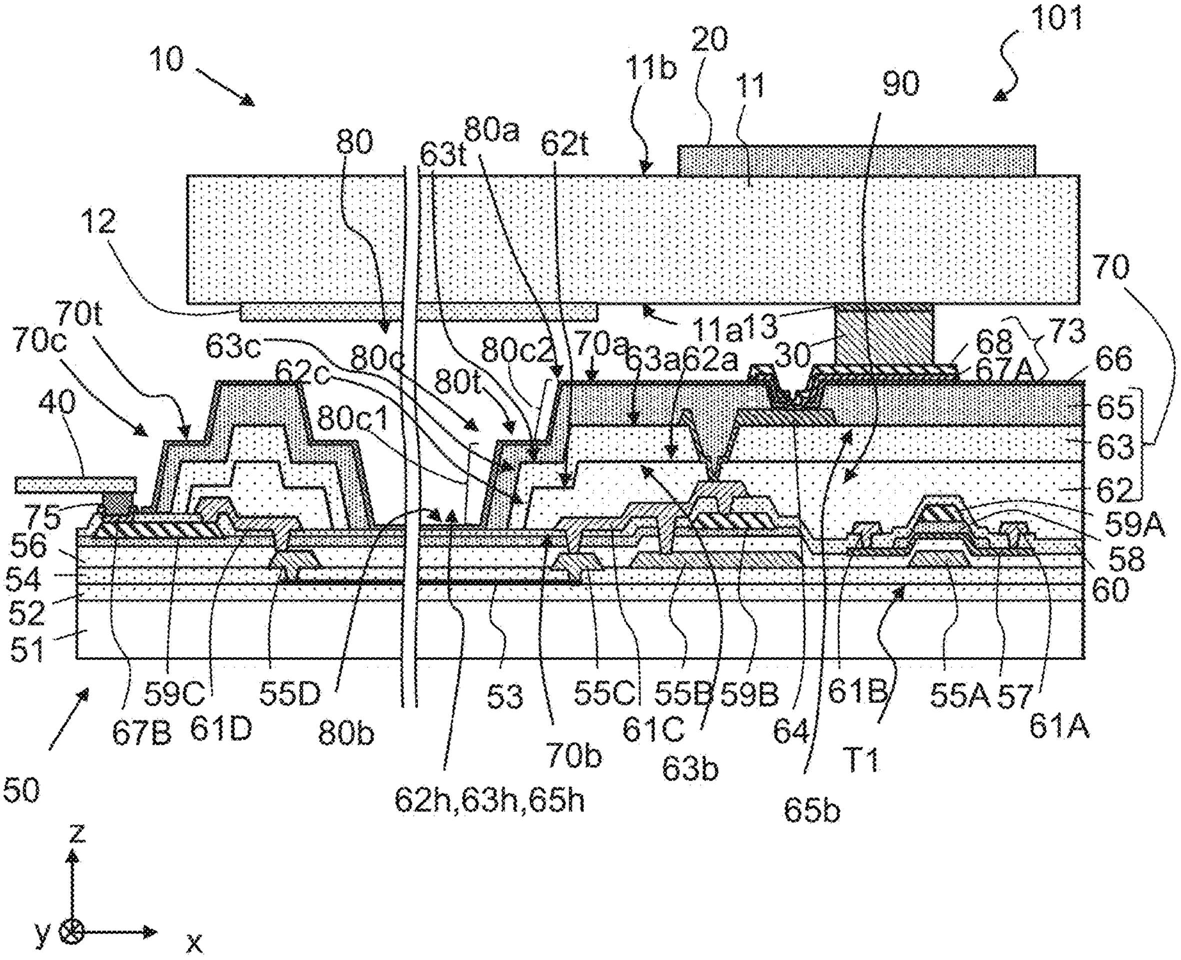
FIG. 17 is a process cross-sectional view illustrating a method for manufacturing the phased array antenna.

As illustrated in FIG. 17, a phased array antenna 101 is completed by bonding the second terminal 73 of the TFT substrate 50 with the first terminal 13 of the printed circuit board 10 via a conductor 30 such as a solder bump.

Thus, according to the present embodiment, even if the thickness of the flattening multilayer 70 is large, the formation of the recessed portion 80 makes it possible to reduce the area of larger thickness in the flattening multilayer 70, thereby reducing the stress generated in the flattening multilayer 70 and preventing the occurrence of various problems caused by stress. Specifically, even if the flattening multilayer 70 is provided on only one side of the TFT substrate 50, it is possible to suppress the following problems by reducing the stress generated in the flattening multilayer 70:

the TFT substrate 50 may warp, making it impossible to properly bond the TFT substrate 50 to the printed circuit board 10; large stress may be applied to bonding portions of any of the first terminals 13, the conductors 30, and the second terminals 73 located between the TFT substrate 50 and the printed circuit board 10, which may cause cracks or breakage of lines to occur; and stress of the printed circuit board may be transmitted, which may reduce the reliability of the phased array antenna.

In addition, with a terrace 80*t* provided on the side face 80*c* of the flattening multilayer 70, the resist film for patterning wiring layers 64 to be located inside the flattening multilayer 70 and the second terminals 73 to be formed on the flattening multilayer 70 is prevented from having a too large thickness in the vertical direction on the side face. Therefore, wiring layers and terminals can be patterned reliably, and manufacturing yields can be increased.

In contrast, if the first flattening layer 62 and the second flattening layer 63 do not have terraces on their side faces, the resist pattern 71 may not be formed correctly, and there is a possibility that wiring layers with correct patterns may not be formed. The reason for this is explained with reference to FIGS. 18 to 21.

Figure 18:
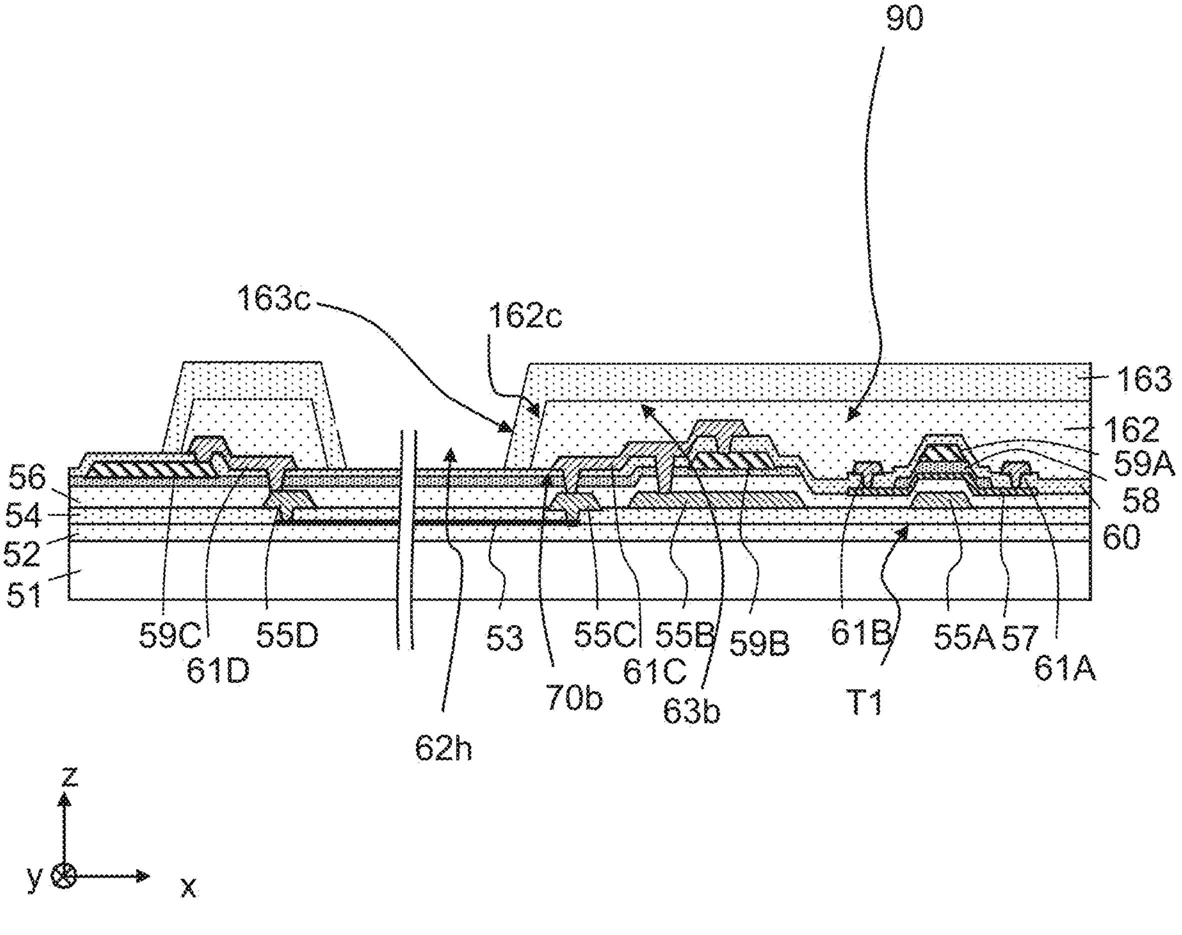
FIG. 18 is a process cross-sectional view for explaining the reason why patterning failures of resist and metal films occur when a flattening multilayer without terraces is used.
Figure 19:
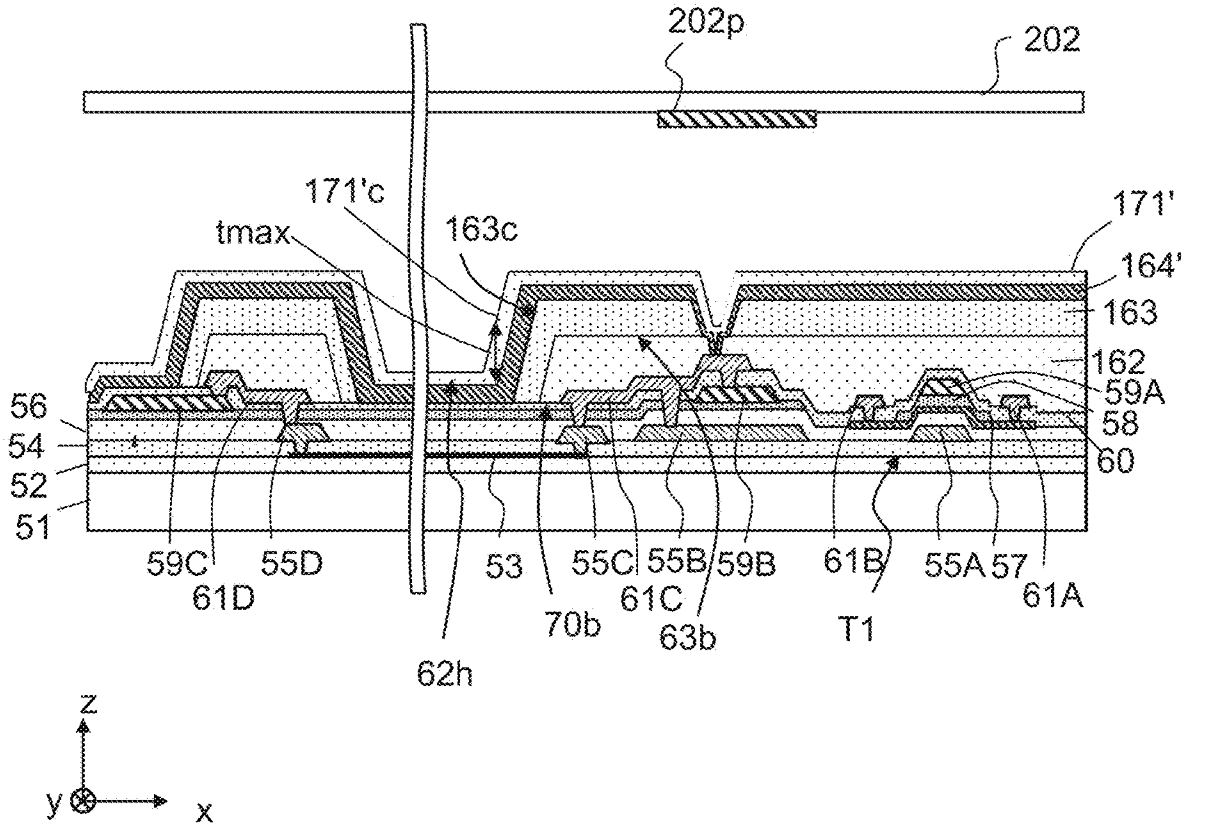
FIG. 19 is a process cross-sectional view for explaining the reason why patterning failures of resist and metal films occur when the flattening multilayer without terraces is used.

As illustrated in FIG. 18, a case is assumed where a first flattening layer 162 does not have a terrace on its side face 162*c*, and a second flattening layer 163 also does not have a terrace on its side face 163*c*. As illustrated in FIG. 19, when a metal film 164' is formed on the second flattening layer 163 and an uncured resist film 171' is further formed, an inclined part 171'*c* of the uncured resist film 171' is formed continuously on the side face 163*c*. Therefore, as illustrated in FIG. 19, the thickness of the inclined part 171'*c* in the vertical direction becomes tmax at maximum.

Figure 20:
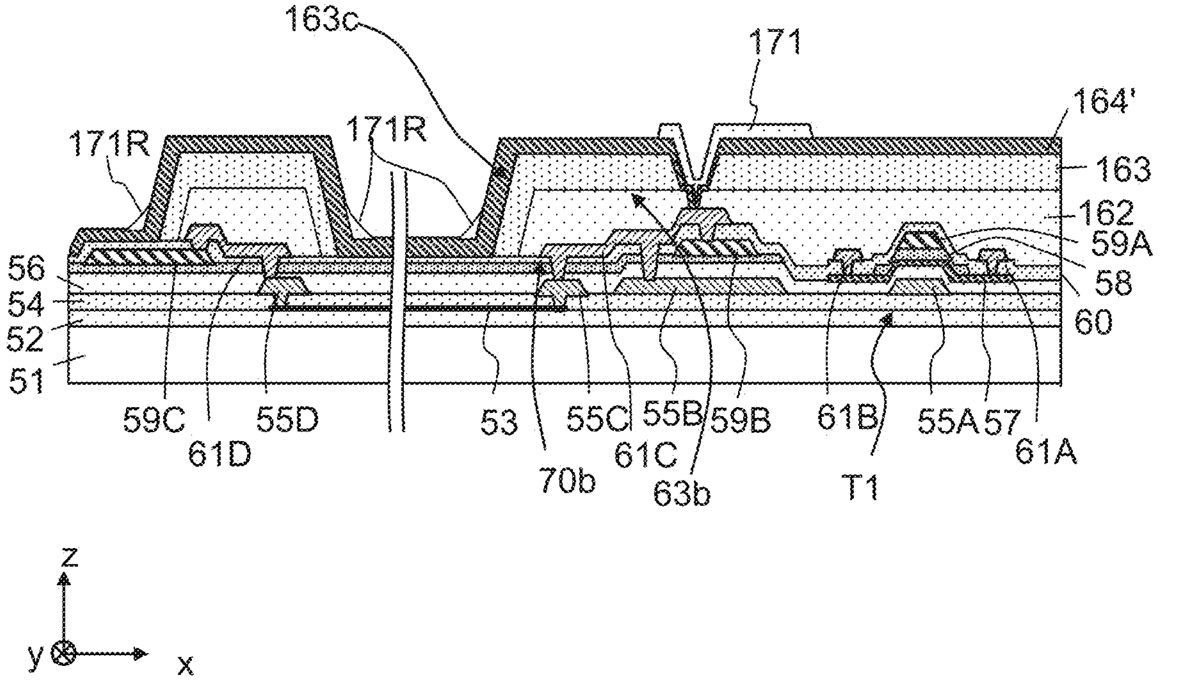
FIG. 20 is a process cross-sectional view for explaining the reason why patterning failures of resist and metal films occur when the flattening multilayer without terraces is used.
Figure 21:
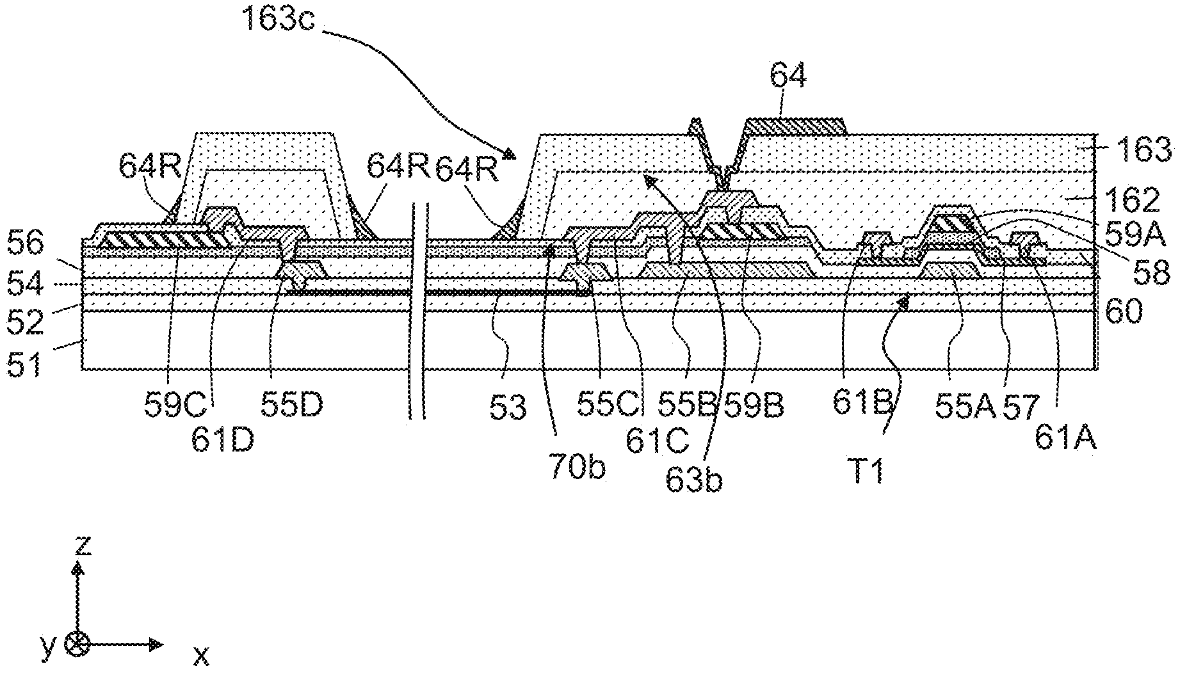
FIG. 21 is a process cross-sectional view for explaining the reason why patterning failures of resist and metal films occur when the flattening multilayer without terraces is used.

When the uncured resist film 171' is exposed using the exposure mask 202 having the pattern 202*p* corresponding to the wiring layer 64, the amount of exposure becomes insufficient in an area where the inclined part 171'*c* has a thickness in the vertical direction of tmax. Therefore, as illustrated in FIG. 20, after development, a resist residue 171R remains, partially covering the side face 163*c* of the second flattening layer 163. Therefore, when the metal film 164' is etched by dry etching using the resist pattern 171 as a mask, the metal film 164' remains also in the areas where the residue 171R remains, and as illustrated in FIG. 21, the metal patterns 64R are formed. Since such a TFT substrate is determined to be defective, this causes a decrease in the manufacturing yield of the TFT substrate 50. Since many steps in the manufacturing process of the TFT substrate 50 have been completed before the wiring layer 64 is formed, the occurrence of defects at this point also leads to an increase in manufacturing costs and cycle time. With the configuration of the phased array antenna 101 of the present embodiment, it is possible to solve such manufacturing problems.

Furthermore, in the configuration of the phased array antenna 101 of the present embodiment, since the phases of the transmission/reception signals are controlled by the beamforming ICs 20, the temperature stability is superior to the case where phase control using a dielectric material is used. Furthermore, by forming at least a part of the circuits that control the beamforming ICs 20 on a TFT substrate 50 that is separate from the printed circuit board 10, the scale of the circuits arranged on the printed circuit board 10 can be reduced, areas of the transmission/reception electrodes 12 can be increased, and the number of transmission/reception electrodes can be increased. Therefore, it is possible to improve transmitting/receiving sensitivity and beam control.

Furthermore, in the printed circuit board 10, the transmission/reception electrodes 12 and the beamforming ICs 20 are mounted on different main surfaces, respectively. Therefore, the degree of freedom in arranging the transmission/reception electrodes 12 can be increased, and a sufficient area for arranging the transmission/reception electrodes 12 can be secured.

Furthermore, by mounting the transmission/reception electrodes on the first main surface 11*a* facing the TFT substrate 50, the transmission/reception electrodes 12 can be prevented from being exposed to the outside, and the radiation conductors of the transmission/reception electrodes 12 can be protected. Since the beamforming ICs 20 are mounted on the second main surface 11*b*, interference of the beamforming ICs 20 can be avoided when the printed circuit board 10 and the TFT substrate 50 are bonded.

Furthermore, when the control circuits formed on the TFT substrate 50 include TFTs each having an oxide semiconductor layer, leakage current when the TFTs are off can be reduced. Since the TFT channel has high electron mobility, it has excellent response at high frequencies. Furthermore, the TFT has a double gate structure, which enables to reduce leakage current and increase reliability.

Furthermore, when copper is used for the wiring layers of the TFT substrate 50, loss during high frequency control can be reduced. Since the flattening layers are made of an organic material, the dielectric constant can be lowered, and loss between the wiring layers can be reduced. Furthermore, since the dielectric loss tangent is small when the organic material is polyimide, the dielectric loss can be reduced when high frequency signals are transferred.

Further, the TFT substrate 50 can include, for example, a voltage divider circuit for supplying bias voltages to the beamforming ICs 20. This allows the number of circuits formed on the printed circuit board to be reduced and the area of the antenna to be increased. Such voltage divider circuits can be formed using oxide conductors.

Second Embodiment

Figure 22:
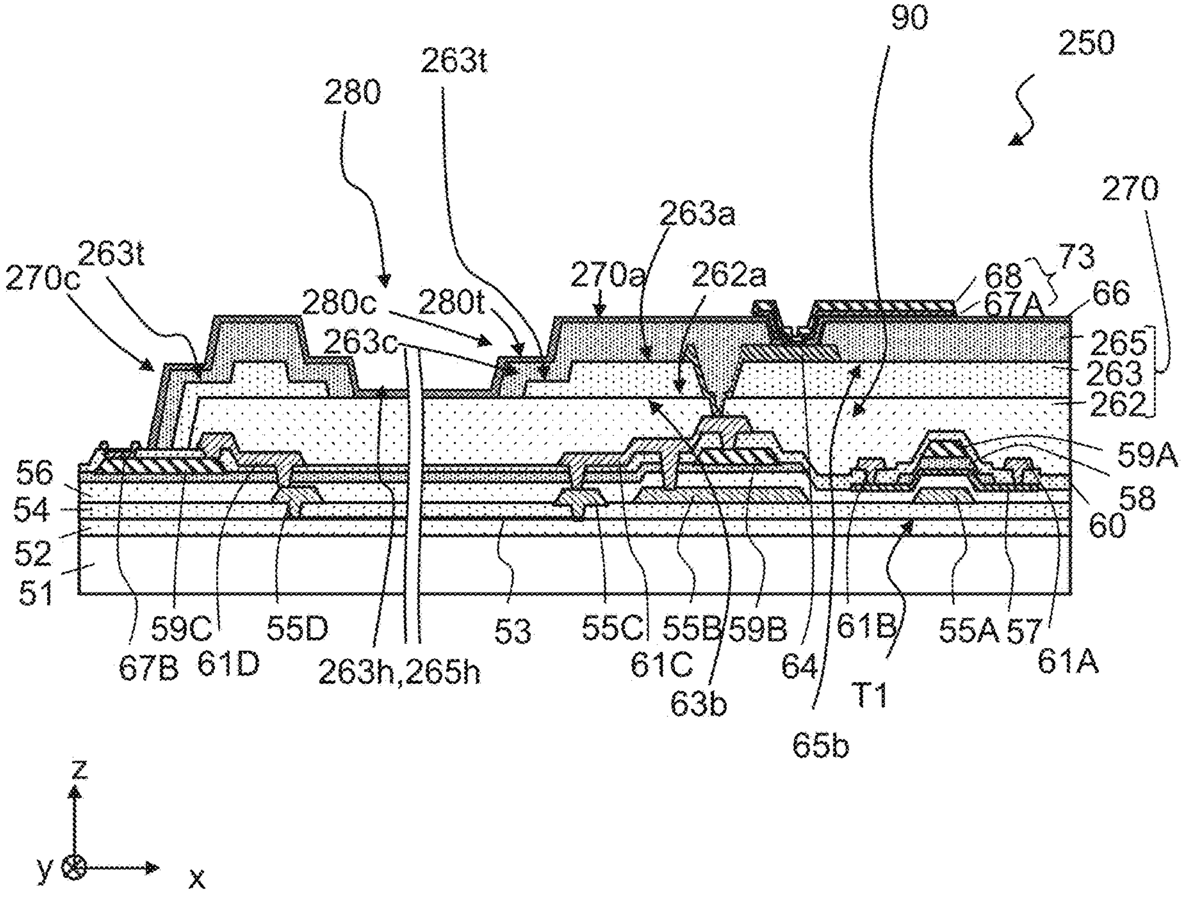
FIG. 22 is a cross-sectional view illustrating an exemplary TFT substrate of a phased array antenna of a second embodiment.

FIG. 22 is a schematic cross-sectional view illustrating a part of an exemplary configuration of a TFT substrate 250 of a phased array antenna of the present embodiment. The TFT substrate 250 includes a flattening multilayer 270 in a form different from that in the first embodiment.

As illustrated in FIG. 22, the flattening multilayer 270 includes a first flattening layer 262, a second flattening layer 263, and a third flattening layer 265. The flattening multilayer 270 includes recessed portions 280 having openings 280*a*, respectively, on its top face 270*a*. As is the case with the first embodiment, the recessed portions 280 are arranged at positions that overlap the transmission/reception electrodes 12 in plan view. The first flattening layer 262 does not have a terrace on its side face 262*c*. The first flattening layer 262 does not have a first through hole. On the other hand, the second flattening layer 263 covers a top face 262*a* of the first flattening layer 262, and has a second terrace 263*t* on the side face 263*c*. The second flattening layer 263 includes a second through hole 263*h* that expose a part of the top face 262*a* of the first flattening layer 262.

The third flattening layer 265 covers a top face 263*a* and a side face 263*c* of the second flattening layer 263, and has a terrace 280*t* on the side face 280*c*. Furthermore, the third flattening layer 265 has a third through hole 265*h* that overlaps with the second through hole 263*h*.

By providing the recessed portion 280 in the flattening multilayer 270, as is the case with the first embodiment, the stress generated in the flattening multilayer can be reduced, and various problems caused by the stress can be prevented. As a result, a phased array antenna with high reliability can be realized.

In addition, since the second terrace 263*t* is provided on the side face 263*c* of the second flattening layer 263, unnecessary resist residue does not remain when the wiring layer 64 is formed, as described in the first embodiment. In addition, since the flattening multilayer 270 also has the terrace 270*t* on the side face 270*c*, unnecessary resist residue does not remain when the second terminal 73 is formed. Therefore, it is possible to manufacture the phased array antenna of the present embodiment, while suppressing a decrease in manufacturing yield, an increase in manufacturing cost, and an increase in cycle time.

OTHER EMBODIMENTS

Various modifications can be made to the phased array antenna of the present disclosure. First, the planar shape of the recessed portion provided in the flattening multilayer, that is, the shape of the opening is not limited to a regular hexagon but may be other shapes such as a circle, an ellipse, an oval, a triangle, a rectangle, or the like. In the first and second embodiments, the opening, terrace and bottom of the recessed portion all have the same regular hexagonal shape, but at least one of them may have a different shape.

Furthermore, the arrangement of the plurality of recessed portions in the flattening multilayer is not limited to that in the first and second embodiments, and the recessed portions may be arranged in another manner. The transmission/reception electrodes 12 and the beamforming ICs 20 on the printed circuit board 10 may also be arranged in another manner. Further, the radiation conductors of the transmission/reception electrodes 12 may have a shape other than a circle. Furthermore, the TFT substrate 50 may include a control circuit other than the circuit shown in FIG. 5.

The number of the flattening layers included in the flattening multilayer may be two, or may be four or more. The position of the wiring layer that is arranged within the flattening multilayer and electrically connects the wiring layer 61C and the second terminal 73 is not limited to between the second flattening layer 63 and the third flattening layer 65, either, and the wiring layer may be located between other flattening layers, or may be located between a plurality of the flattening layers.

In the first and second embodiments, terraces are provided on the side faces of the recessed portions provided in the TFT substrate. However, during the formation of the wiring layers located in the flattening multilayer and the second terminals located on the flattening multilayer, when the thickness of, for example, the flattening multilayer, is small to such an extent that the generation of unnecessary resist residue can be suppressed, terraces do not have to be provided on the side faces.

The phased array antenna of the present disclosure can also be explained as follows.

A phased array antenna according to a first configuration is a phased array antenna that includes:

- a printed circuit board including a plurality of first terminals; and
- a TFT substrate including a plurality of second terminals and a plurality of third terminals, the TFT substrate being arranged relative to the printed circuit board in such a manner that the plurality of first terminals and the plurality of second terminals face, respectively, and are electrically connected, wherein the printed circuit board includes:

- a first substrate;
- a plurality of transmission/reception electrodes arranged one-dimensionally or two-dimensionally on the first substrate; and
- a plurality of beamforming ICs that are arranged on the first substrate and are connected with the plurality of first terminals and the plurality of transmission/reception electrodes, and the TFT substrate includes:

- a second substrate;
- a plurality of control circuits that are formed on the second substrate and are connected to the plurality of second terminals and the plurality of third terminals, each control circuit including at least one TFT and generating a control signal that controls one of the plurality of beamforming ICs;
- a flattening multilayer arranged on the second substrate in such a manner that the flattening multilayer covers the plurality of control circuits and exposes the plurality of third terminals; and
- a plurality of recessed portions provided in the flattening multilayer, each recessed portion having an opening in a top face of the flattening multilayer.

According to the first configuration, the recessed portions are provided in the flattening multilayer, whereby stress in the flattening multilayer can be reduced.

A phased array antenna according to a second configuration may have the first configuration further characterized in that, in plan view, each of the plurality of recessed portions overlaps one of the plurality of transmission/reception electrodes on the printed circuit board. Since the flattening multilayer has a smaller thickness in the recessed portions, influences on radio waves transmitted/received by an antenna can be suppressed.

A phased array antenna according to a third configuration may have the first configuration further characterized in that each of the plurality of recessed portions has a side face, and a terrace provided on the side face. By having the terrace on the side face, resist remaining can be suppressed.

A phased array antenna according to a fourth configuration may have the first configuration further characterized in that the flattening multilayer includes a first flattening layer located on the second substrate, covering the plurality of control circuits, and a second flattening layer that is located on the first flattening layer and includes a plurality of second through holes, wherein each recessed portion is located in one of the plurality of second through holes.

A phased array antenna according to a fifth configuration may have the fourth configuration further characterized in that the first flattening layer includes a plurality of first through holes, and the recessed portions are respectively located in the first through holes.

A phased array antenna according to a sixth configuration may have the fourth configuration further characterized in that the recessed portions are located on the first flattening layer.

A phased array antenna according to a seventh configuration may have the fourth configuration further characterized in that: the flattening multilayer further includes a third flattening layer that is located on the second flattening layer, covering a second side face, and has a third side face; the first flattening layer has first side faces facing the first through holes, respectively, and first terraces located on the first side faces, respectively; the second flattening layer has second side faces facing the second through holes, respectively, and second terraces located on the second side faces, respectively; the second side faces of the second flattening layer cover the first side faces of the first flattening layer, respectively; and the side faces of the recessed portions cover the second side faces, respectively.

A phased array antenna according to an eighth configuration may have the sixth configuration further characterized in that: the flattening multilayer further includes a third flattening layer that is located on the second flattening layer; the second flattening layer has second side faces facing the second through holes, respectively, and second terraces located on the second side faces, respectively; and the side faces of the recessed portions cover the second side faces, respectively.

A phased array antenna according to a ninth configuration may have the seventh configuration further characterized in that: the flattening multilayer further includes a wiring layer that is located between the second flattening layer and the third flattening layer, or between the first flattening layer and the second flattening layer; and the wiring layer is connected to a plurality of the control circuits and the second terminals.

A phased array antenna according to a tenth configuration may have the eighth configuration further characterized in that: the flattening multilayer further includes a wiring layer that is located between the second flattening layer and the third flattening layer, or between the first flattening layer and the second flattening layer; and the wiring layer is connected to a plurality of the control circuits and the second terminals.

A phased array antenna according to an eleventh configuration may have the ninth or tenth configuration further characterized in that the wiring layer is located around the recessed portions.

A phased array antenna according to a twelfth configuration may have the ninth or tenth configuration further characterized in that at least one of the first flattening layer, the second flattening layer, and the third flattening layer has a maximum thickness of 2 μm or more.

A phased array antenna according to a thirteenth configuration may have the ninth or tenth configuration further characterized in that the first flattening layer, the second flattening layer, and the third flattening layer are made of an organic material.

A phased array antenna according to a fourteenth configuration may have the ninth or tenth configuration further characterized in that at least one of the first flattening layer, the second flattening layer, and the third flattening layer is made of polyimide resin.

A phased array antenna according to a fifteenth configuration may have any one of the first to tenth configurations further characterized in that no conductor is located in the recessed portions.

The present disclosure contains subject matter related to that disclosed in Japanese Priority Patent Application JP 2023-163150 filed in the Japan Patent Office on Sep. 26, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A phased array antenna comprising:
- a printed circuit board including a plurality of first terminals; and
- a thin-film transistor (TFT) substrate including a plurality of second terminals and a plurality of third terminals, the TFT substrate being arranged relative to the printed circuit board in such a manner that the plurality of first terminals and the plurality of second terminals face, respectively, and are electrically connected, wherein the printed circuit board includes:
- a first substrate;
- a plurality of transmission and reception electrodes arranged one-dimensionally or two-dimensionally on the first substrate; and
- a plurality of beamforming integrated circuits (ICs) that are arranged on the first substrate and are connected with the plurality of first terminals and the plurality of transmission and reception electrodes, and the TFT substrate includes:
- a second substrate;
- a plurality of control circuits that are formed on the second substrate and are connected to the plurality of second terminals and the plurality of third terminals, each control circuit including at least one TFT and generating a control signal that controls one of the plurality of beamforming ICs;
- a flattening multilayer arranged on the second substrate in such a manner that the flattening multilayer covers the plurality of control circuits and exposes the plurality of third terminals; and
- a plurality of recessed portions provided in the flattening multilayer, each recessed portion having an opening in a top face of the flattening multilayer.

2. The phased array antenna according to claim 1, wherein, in plan view, each of the plurality of recessed portions overlaps one of the plurality of transmission and reception electrodes on the printed circuit board.

3. The phased array antenna according to claim 1, wherein each of the plurality of recessed portions has a side face, and a terrace provided on the side face.

4. The phased array antenna according to claim 1, wherein the flattening multilayer includes:
- a first flattening layer located on the second substrate, covering the plurality of control circuits; and
- a second flattening layer that is located on the first flattening layer and includes a plurality of second through holes, wherein each recessed portion is located in one of the plurality of second through holes.

5. The phased array antenna according to claim 4, wherein the first flattening layer includes a plurality of first through holes, and each of the recessed portions is located in one of the plurality of first through holes.

6. The phased array antenna according to claim 4, wherein each of the recessed portions is located on the first flattening layer.

7. The phased array antenna according to claim 5, wherein the flattening multilayer further includes a third flattening layer that is located on the second flattening layer, covering the second side face, and has a third side face, the first flattening layer has first side faces facing the first through holes, respectively, and first terraces located on the first side faces, respectively, the second flattening layer has second side faces facing the second through holes, respectively, and second terraces located on the second side faces, respectively, the second side faces of the second flattening layer cover the first side faces of the first side faces of the first flattening layer, respectively, and the side faces of the recessed portions cover the second side faces, respectively.

8. The phased array antenna according to claim 6, wherein the flattening multilayer further includes a third flattening layer that is located on the second flattening layer, the second flattening layer has second side faces facing the second through holes, respectively, and second terraces located on the second side faces, respectively, and the side faces of the recessed portions cover the second side faces, respectively.

9. The phased array antenna according to claim 7, wherein the flattening multilayer further includes a wiring layer that is located between the second flattening layer and the third flattening layer, or between the first flattening layer and the second flattening layer, and the wiring layer is connected to the plurality of control circuits and the second terminals.

10. The phased array antenna according to claim 8, wherein the flattening multilayer further includes a wiring layer that is located between the second flattening layer and the third flattening layer, or between the first flattening layer and the second flattening layer, and the wiring layer is connected to the plurality of control circuits and the second terminals.

11. The phased array antenna according to claim 9, wherein the wiring layer is located around the recessed portions.

12. The phased array antenna according to claim 9, wherein at least one of the first flattening layer, the second flattening layer, and the third flattening layer has a maximum thickness of 2 μm or more.

13. The phased array antenna according to claim 9, wherein the first flattening layer, the second flattening layer, and the third flattening layer are made of an organic material.

14. The phased array antenna according to claim 9, wherein at least one of the first flattening layer, the second flattening layer, and the third flattening layer is made of polyimide resin.

15. The phased array antenna according to claim 1, wherein no conductor is located in the recessed portions.

* * * * *